US012091983B2

(12) United States Patent
Sakashita et al.

(10) Patent No.: US 12,091,983 B2
(45) Date of Patent: Sep. 17, 2024

(54) STATOR VANE SEGMENT AND STEAM TURBINE PROVIDED WITH SAME

(71) Applicant: MITSUBISHI HEAVY INDUSTRIES, LTD., Tokyo (JP)

(72) Inventors: Kenichi Sakashita, Yokohama (JP); Shouhei Danno, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/020,110

(22) PCT Filed: Jul. 26, 2021

(86) PCT No.: PCT/JP2021/027528
§ 371 (c)(1),
(2) Date: Feb. 7, 2023

(87) PCT Pub. No.: WO2022/034783
PCT Pub. Date: Feb. 17, 2022

(65) Prior Publication Data
US 2023/0272725 A1 Aug. 31, 2023

(30) Foreign Application Priority Data
Aug. 13, 2020 (JP) ................................ 2020-136665

(51) Int. Cl.
*F01D 9/02* (2006.01)
*F01D 11/00* (2006.01)
(Continued)

(52) U.S. Cl.
CPC ............... *F01D 25/32* (2013.01); *F01D 9/02* (2013.01); *F01D 11/001* (2013.01); *F01D 25/24* (2013.01); *F05D 2220/31* (2013.01)

(58) Field of Classification Search
CPC .......... F01D 25/32; F01D 9/02; F01D 11/001; F01D 25/24; F01D 25/243; F01D 25/246; F05D 2220/31
See application file for complete search history.

(56) References Cited

U.S. PATENT DOCUMENTS 4,355,952 A * 10/1982 Brown .................... F01D 9/042 415/137
5,618,161 A * 4/1997 Papageorgiou ....... F01D 25/246 415/190
(Continued)

FOREIGN PATENT DOCUMENTS

EP 1707744 A2 10/2006
JP S62-190803 U 12/1987
(Continued)

OTHER PUBLICATIONS

International Search Report dated Sep. 7, 2021, issued in counterpart Application No. PCT/JP2021/027528, with English translation. (6 pages).
(Continued)

*Primary Examiner* — David E Sosnowski
*Assistant Examiner* — Theodore C Ribadeneyra
(74) *Attorney, Agent, or Firm* — WHDA, LLP

(57) ABSTRACT

A stator blade segment includes a circumferentially extending outer blade ring, a stator blade extending radially inward from the outer blade ring, and a sealing member. The stator blade has a cavity that is formed in the interior of the blade and that communicates with the surface of the blade. The outer blade ring has a blade ring body and two blade ring protrusions. The two blade ring protrusions protrude radially outward from an anti-gas path surface of the blade ring body and face each other across a gap in an axial direction, and together with a casing, a drain recovery space is formed between the two blade ring protrusions. The blade ring body
(Continued)

has a blade surface drain recovery passage that allows communication between the cavity and the drain recovery space. One of the two blade ring protrusions has a sealing surface.

10 Claims, 5 Drawing Sheets

(51) Int. Cl.
*F01D 25/24* (2006.01)
*F01D 25/32* (2006.01)

(56) References Cited

U.S. PATENT DOCUMENTS

| | | | |
|---|---|---|---|
| 2001/0025481 A1 | 10/2001 | Magoshi et al. | |
| 2007/0128020 A1 | 6/2007 | Dervaux et al. | |
| 2008/0193283 A1 | 8/2008 | Burdgick et al. | |
| 2013/0149106 A1 | 6/2013 | Giusti et al. | |
| 2015/0098829 A1* | 4/2015 | Baldiga | F01D 25/246 416/179 |
| 2016/0024926 A1 | 1/2016 | Jaureguiberry et al. | |
| 2016/0245106 A1* | 8/2016 | Samudrala | F01D 5/3007 |
| 2021/0262355 A1 | 8/2021 | Sato et al. | |

FOREIGN PATENT DOCUMENTS

| | | | |
|---|---|---|---|
| JP | S64-045904 A | 2/1989 | |
| JP | H08-200007 A | 8/1996 | |
| JP | H10-299410 A | 11/1998 | |
| JP | 3046026 B1 * | 5/2000 | F01D 9/04 |
| JP | 2001-289059 A | 10/2001 | |
| JP | 2007-154890 A | 6/2007 | |
| JP | 2008-196488 A | 8/2008 | |
| JP | 2013-122246 A | 6/2013 | |
| JP | 2016-511362 A | 4/2016 | |
| JP | 6163299 B2 | 7/2017 | |
| JP | 2020-2937 A | 1/2020 | |

OTHER PUBLICATIONS

Written Opinion dated Sep. 7, 2021, issued in counterpart Application No. PCT/JP2021/027528, with English translation. (16 pages).

* cited by examiner

STATOR VANE SEGMENT AND STEAM TURBINE PROVIDED WITH SAME

TECHNICAL FIELD

The present disclosure relates to a stator vane segment and a steam turbine provided with the same.

Priority is claimed on Japanese Patent Application No. 2020-136665 filed on Aug. 13, 2020, the content of which is incorporated herein by reference.

BACKGROUND ART

Steam turbines generally include a rotor that rotates around an axis, a plurality of stator vane segments, and a casing that covers the rotor and the outer peripheries of the plurality of stator vane segments. The rotor has a rotor shaft that is long in an axis direction in which the axis extends, and a plurality of rotor blade rows that are attached to an outer periphery of the rotor shaft. The plurality of stator vane segments are aligned in the axis direction within a casing. Each stator vane segment includes one or more stator vane rows, an inner vane ring attached to a radial inner side of the one or more stator vane rows, and an outer vane ring attached to a radial outer side of the one or more stator vane rows. Each stator vane row is configured by a plurality of stator vanes aligned in a circumferential direction. Each of the plurality of stator vane rows is disposed on an axial upstream side of any one rotor blade row of the plurality of rotor blade rows.

The dryness of the steam that has flowed into the casing gradually decreases as the steam flows to an axial downstream side along a steam flow path. For this reason, steam drain may adhere to surfaces of the plurality of stator vanes constituting the stator vane row on the axial downstream side, among the plurality of stator vane rows. There is a case where a part of the steam drain flows to the axial downstream side and collides with surfaces of a plurality of rotor blades constituting the rotor blade row present on the axial downstream side of the stator vane row to damage the rotor blades. For this reason, for example, a steam turbine described in the following PTL 1 includes a drain recovery mechanism that recovers the steam drain.

A stator vane described in PTL 1 has a cavity formed inside the stator vane and a vane surface drain passage that allows a surface of the stator vane and the cavity to communicate with each other. The outer vane ring and the casing cooperate with each other to form a space in which the steam drain that has flowed into the cavity of the stator vane is accumulated. The steam drain accumulated in the space is discharged to the outside of the casing. The drain recovery mechanism includes the cavity, the vane surface drain passage, and the space.

CITATION LIST

Patent Literature

[PTL 1] Japanese Patent No. 6163299

SUMMARY OF INVENTION

Technical Problem

In a case where the outer vane ring and the casing cooperate with each other to form the space in which the steam drain is accumulated as in the steam turbine described in PTL 1, when the sealing performance of a gap between the outer vane ring and the casing is low, the amount of steam and steam drain leaking from the gap increases. In this case, in order to recover a large amount of the steam drain that has adhered to a vane surface of the stator vane, it is necessary to allow a large amount of the steam to flow into the space together with the steam drain, and the recovery efficiency of the steam drain decreases.

Thus, an object of the present disclosure is to provide a technique capable of improving the recovery efficiency of steam drain.

Solution to Problem

A stator vane segment as one aspect for achieving the above object includes an outer vane ring that extends in a circumferential direction with respect to an axis; a plurality of stator vanes that extend from the outer vane ring toward a radial inner side with respect to the axis and that are aligned in the circumferential direction; and a sealing member that is formed of a member different from the outer vane ring.

Each of the plurality of stator vanes has a cavity formed inside the stator vane and a vane surface drain passage that allows a surface of the stator vane and the cavity to communicate with each other. The outer vane ring has a vane ring body and two vane ring protrusions. The vane ring body includes a gas path surface that extends in the circumferential direction and faces the radial inner side, a counter gas path surface that extends in the circumferential direction and has a back-to-back relationship with the gas path surface, and a vane surface drain recovery passage. The two vane ring protrusions protrude from the counter gas path surface to a radial outer side with respect to the axis, extend in the circumferential direction, face each other at an interval from each other in an axis direction where the axis extends, and cooperate with a casing present on an outer peripheral side of the vane ring body to form a drain recovery space between the two vane ring protrusions. The vane surface drain recovery passage extends from the cavity toward the radial outer side and is open at a position of the counter gas path surface between the two vane ring protrusions. One of the two vane ring protrusions has a sealing surface. The sealing member is disposed between a part of the casing and the sealing surface of the one vane ring protrusion and comes into contact with the sealing surface.

In the present aspect, steam drain that has adhered to a stator surface of the stator vane flows into the drain recovery space through the vane surface drain passage and the cavity. In the present aspect, since the sealing member is disposed between a part of the casing and the sealing surface of the one vane ring protrusion, the sealing performance between the casing and the one vane ring protrusion is improved. For this reason, even when there is a pressure difference between the drain recovery space that is formed as the casing and the outer vane ring cooperate with each other and a space adjacent to the drain recovery space, the pressure difference can be maintained, and the outflow of steam from one of two adjacent spaces to the other can be suppressed. Therefore, in the present aspect, the steam drain can be guided to the drain recovery space while suppressing the exhaust of the steam that has not been drained.

A steam turbine as an aspect for achieving the above object includes the stator vane segment of the above one aspect; and the casing that covers an outer peripheral side of the stator vane segment.

The casing has a casing body that is separated from the stator vane segment to the radial outer side, extends in the circumferential direction, and covers the outer peripheral side of the stator vane segment, at least one casing protrusion, and a drain discharge passage. The drain discharge passage extends from the drain recovery space toward the radial outer side and is open on an outer peripheral surface of the casing body. The at least one casing protrusion protrudes from the casing body to the radial inner side and extends in the circumferential direction such that the at least one casing protrusion cooperates with the outer vane ring to form the drain recovery space between the at least one casing protrusion and the two vane ring protrusions on the radial outer side with respect to the counter gas path surface. A part of the at least one casing protrusion overlaps, out of the one vane ring protrusion and the other vane ring protrusion in the two vane ring protrusions, the other vane ring protrusion in terms of a position in the radial direction with respect to the axis, and is located, out of an axial upstream side which is one side of two sides in the axis direction and an axial downstream side which is the other side, on the axial downstream side with respect to the other vane ring protrusion. The part of the at least one casing protrusion has a casing other-side sealing surface facing the axial upstream side. The other vane ring protrusion faces the axial downstream side and has a vane ring other-side sealing surface capable of coming into contact with the casing other-side sealing surface. The other part of the at least one casing protrusion has a casing one-side sealing surface that comes into contact with the sealing member. The one vane ring protrusion faces the casing one-side sealing surface at an interval therefrom and has a vane ring one-side sealing surface serving as the sealing surface. The sealing member is disposed between the casing one-side sealing surface and the vane ring one-side sealing surface.

The stator vane segment receives a force directed to the axial downstream side from the steam flowing through the steam flow path during the driving of the steam turbine. For this reason, the stator vane segment tends to move to the axial downstream side relative to the casing. Thus, the vane ring other-side sealing surface moves to the axial downstream side with respect to the casing other-side sealing surface and come into contact with the casing other-side sealing surface. Therefore, in the present aspect, the sealing performance between a part of at least one casing protrusion and the other vane ring protrusion during the driving of the steam turbine is high, and steam leakage from between a part of the at least one casing protrusion and the other vane ring protrusion can be suppressed.

The sealing member is disposed between the casing one-side sealing surfaces of the other part of the at least one casing protrusion and the vane ring one-side sealing surface of the one vane ring protrusion. For this reason, in the present aspect, even when the one vane ring protrusion moves to the axial downstream side with respect to the other part of the at least one casing protrusion by driving the steam turbine, the sealing performance between the other part of the at least one casing protrusion and the one vane ring protrusion is high, and steam leakage from between the other part of the at least one casing protrusion and the vane ring protrusion can be suppressed.

Thus, in the present aspect, even when there is a pressure difference between the drain recovery space that is formed as the casing and the outer vane ring cooperate with each other and a space adjacent to the drain recovery space, the pressure difference can be maintained, and the outflow of steam from one of two adjacent spaces to the other can be suppressed.

Advantageous Effects of Invention

In one aspect of the present disclosure, the recovery efficiency of the steam drain can be improved.

DESCRIPTION OF EMBODIMENTS

Figure 1:
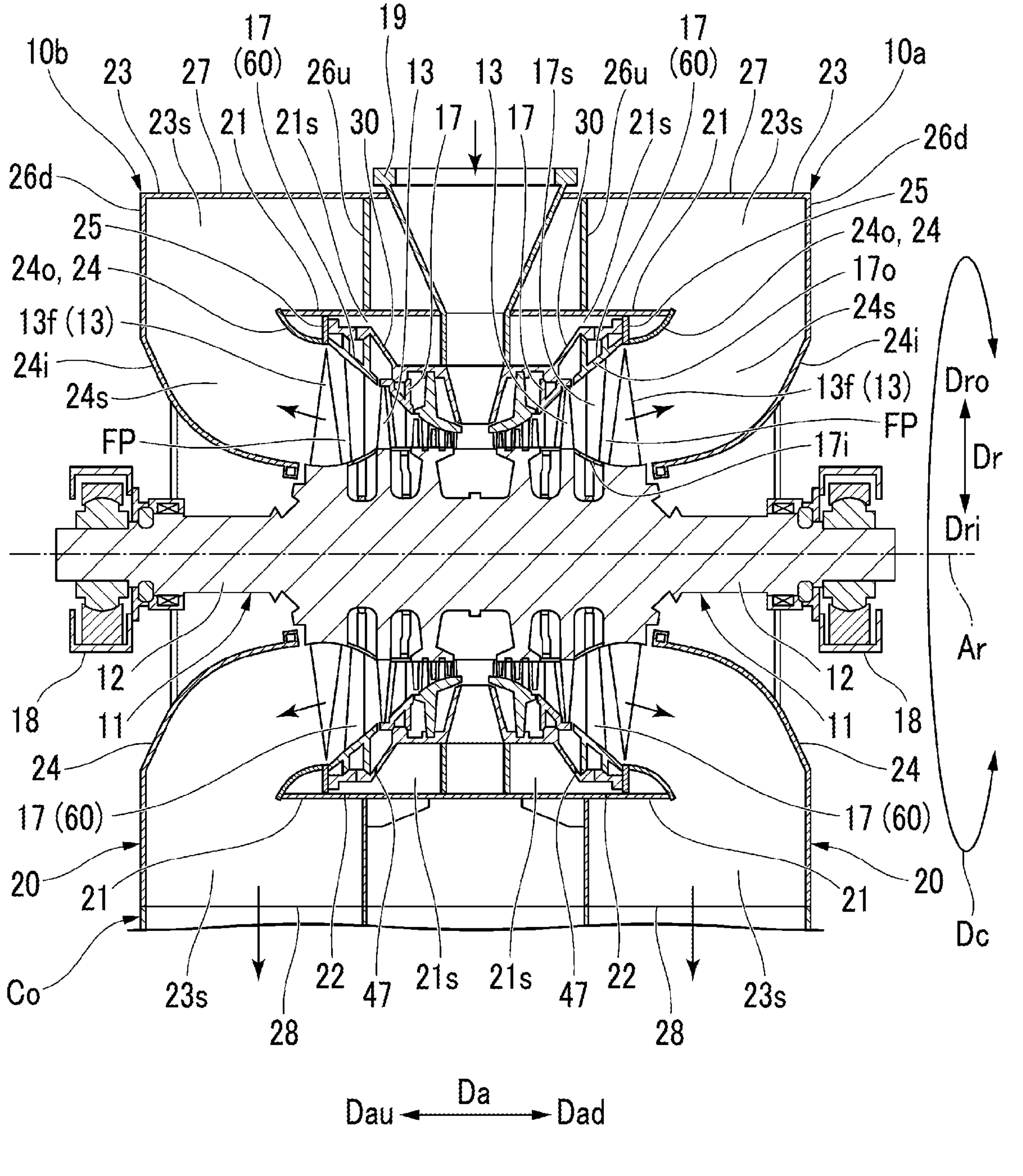
FIG. 1 is a cross-sectional view of a steam turbine in an embodiment according to the present disclosure.

Hereinafter, embodiments of a stator vane segment and a steam turbine including the stator vane segment according to the present disclosure will be described.

Embodiment of Steam Turbine

A steam turbine of the present embodiment will be described with reference to FIG. 1.

The steam turbine of the present embodiment is a dual flow exhaust type steam turbine. For this reason, a steam turbine ST includes a first steam turbine section 10*a* and a second steam turbine section 10*b*. Each of the first steam turbine section 10*a* and the second steam turbine section 10*b* includes a rotor 11 that rotates around an axis Ar, a casing 20 that covers a rotor 11, a plurality of stator vane segments 17 that are fixed to the casing 20, and a steam inlet duct 19. In addition, hereinafter, a direction in which the axis Ar extends is referred to as an axis direction Da, a circumferential direction around the axis Ar is simply referred to as a circumferential direction Dc, and a direction perpendicular to the axis Ar is referred to as a radial direction Dr. Moreover, in the radial direction Dr, a side on the axis Ar is referred to as a radial inner side Dri, and a side opposite to the radial inner side Dri is referred to as a radial outer side Dro.

The first steam turbine section 10*a* and the second steam turbine section 10*b* share the steam inlet duct 19. Components of the first steam turbine section 10*a* excluding the steam inlet duct 19 are disposed on one side in the axis direction Da with respect to the steam inlet duct 19. Additionally, components of the second steam turbine section 10*b* excluding the steam inlet duct 19 are disposed on the other side in the axis direction Da with respect to the steam inlet duct 19. In addition, in each of the steam turbine sections 10*a* and 10*b*, the steam inlet duct 19 side in the previously mentioned axis direction Da is referred to as an axial upstream side Dau, and the opposite side thereof is referred to as an axial downstream side Dad.

The configuration of the first steam turbine section 10*a* and the configuration of the second steam turbine section 10*b* are basically the same. For this reason, the first steam turbine section 10*a* will be mainly described below.

The rotor 11 has a rotor shaft 12 extending in the axis direction Da around the axis Ar, and a plurality of rotor blade rows 13 attached to the rotor shaft 12. The rotor 11 is supported by a bearing 18 so as to be rotatable around the axis Ar. The plurality of rotor blade rows 13 are aligned in the axis direction Da. Each of the rotor blade rows 13 is configured by a plurality of rotor blades aligned in the circumferential direction Dc. The rotor 11 of the first steam turbine section 10*a* and the rotor 11 of the second steam turbine section 10*b* are positioned on the same axis Ar and connected to each other, and integrally rotate around the axis Ar.

The casing 20 has an inner casing (or simply a casing) 30, an outer casing 21, and an exhaust casing 23. The inner casing 30 forms a space having a substantially conical shape around the axis Ar. The plurality of stator vane segments 17 are disposed side by side in the axis direction Da on an inner peripheral side of the inner casing 30. The inner casing 30 is formed of, for example, SS400 which is a kind of steel material, and the stator vane segment 17 is formed of a material which has higher corrosion resistance against steam than the inner casing 30, for example, SC450 which is a kind of carbon steel cast product.

The stator vane segment 17 includes one or more stator vane rows 17*s*, an inner vane ring 17*i* attached to the radial inner side Dri of the one or more stator vane rows 17*s*, and an outer vane ring 17*o* attached to the radial outer side Dro of the one or more stator vane rows 17*s*. Among the plurality of stator vane segments 17, the stator vane segment 17 most upstream on the axial upstream side Dau has a plurality of stator vane rows 17*s*. On the other hand, the stator vane segment 17 most downstream on the axial downstream side Dad has one stator vane row 17*s*. The stator vane row 173 is configured by a plurality of stator vanes aligned in the circumferential direction Dc. Each of the plurality of stator vane rows 17*s* is disposed on the axial upstream side Dau of any one rotor blade row 13 of the plurality of rotor blade rows 13. Both the inner vane ring 17*i* and the outer vane ring 17*o* extend in the circumferential direction Dc. The outer vane ring 17*o* is attached to the inner casing 30.

The outer casing 21 has a cylindrical shape around an axis Ar. The inner casing 30 is disposed on an inner peripheral side of the outer casing 21. A casing inner space 21*s* is formed between the inner peripheral side of the outer casing 21 and an outer peripheral side of the inner casing 30. A drain discharge passage 22 for discharging steam drain accumulated in the casing inner space 21*s* to an exhaust space 23*s*, which will be described below, is formed at a position directly below the axis Ar in the outer casing 21.

The exhaust casing 23 has a diffuser 24, a connecting ring 25, a downstream end plate 26*d*, an upstream end plate 26*u*, and a side peripheral plate 27.

The diffuser 24 has an annular shape with respect to the axis Ar and forms a diffuser space 24*s* that gradually faces the radial outer side Dro as the diffuser 24 moves toward the axial downstream side Dad. The steam that has flowed out from a final-stage rotor blade row 13*f* of the rotor 11 flows into the diffuser space 24*s*. In addition, the final-stage rotor blade row 13*f* is a rotor blade row 13, which is disposed most downstream on the axial downstream side Dad, among the plurality of rotor blade rows 13. The diffuser 24 includes an outer diffuser (or a steam guide or a flow guide) 24*o* that defines an edge of the radial outer side Dro of the diffuser space 24*s*, and an inner diffuser (or a bearing cone) 24*i* that defines an edge of the radial inner side Dri of the diffuser space 24*s*). The outer diffuser 24*o* has an annular cross-section perpendicular to the axis Ar and gradually extends toward the radial outer side Dro as the outer diffuser 24*o* moves toward the axial downstream side Dad. The inner diffuser 24*i* also has an annular cross-section perpendicular to the axis Ar and gradually extends toward the radial outer side Dro as the inner diffuser 24*i* moves toward the axial downstream side Dad.

The connecting ring 25 has an annular shape around the axis Ar. The connecting ring 25 covers an outer peripheral side of the final-stage rotor blade row 13*f*. The connecting ring 25 is attached to the outer casing 21. An end of the outer diffuser 24*o* on the axial upstream side Dau is connected to the connecting ring 25. Additionally, an end of the outer diffuser 24*o* on the axial downstream side Dad is connected to an end of the outer casing 21 on the axial downstream side Dad. The inner diffuser 24*i* is connected to the downstream end plate 26*d*.

The exhaust casing 23 has an exhaust port 28. The exhaust port 28 is open vertically downward toward the radial outer side Dro and a vertically downward direction from the inside. A condenser Co that converts steam back to water is connected to the exhaust port 28. Thus, the steam turbine ST of the present embodiment is a downward exhaust type condensing steam turbine. The downstream end plate 26*d*, the upstream end plate 26*u*, and the side peripheral plate 27 of the exhaust casing 23 form the exhaust space 23*s* that communicates with the diffuser space 24*s*. The exhaust space 23*s* extends around an outer periphery of the diffuser 24 in the circumferential direction Dc with respect to the axis Ar and guides the steam, which has flowed in from the diffuser space 24*s*, to the exhaust port 28.

The downstream end plate 26*d* extends from an edge of the inner diffuser 24*i* on the radial outer side Dro to the radial outer side Dro and defines an edge of the exhaust space 23*s* on the axial downstream side Dad. The downstream end plate 26*d* is substantially perpendicular to the axis Ar. In the downstream end plate 26*d*, a portion above the axis Ar has a substantially semicircular shape as viewed from the axis direction Da. On the other hand, in the downstream end plate 26*d*, a portion below the axis Ar has a substantially rectangular shape as viewed from the axis direction Da. A lower edge of the downstream end plate 26*d* forms a part of the edge of the exhaust port 28.

The upstream end plate 26*u* is disposed on the axial upstream side Dau with respect to the diffuser 24. The upstream end plate 26*u* extends from the outer casing 21 to the radial outer side Dro and defines an edge of the exhaust space 23*s* on the axial upstream side Dau. The upstream end plate 26*u* is substantially perpendicular to the axis Ar. Thus, the upstream end plate 26*u* faces the downstream end plate 26*d* at an interval therefrom in the axis direction Da. A lower edge of the upstream end plate 26*u* forms a part of the edge of the exhaust port 28.

The side peripheral plate 27 is connected to an edge of the downstream end plate 26*d* on the radial outer side Dro and to an edge of the upstream end plate 26*u* on the radial outer side Dro, and extends in the axis direction Da and in the circumferential direction Dc around the axis Ar to define a portion of the edge of the exhaust space 23*s* on the radial outer side Dro. The side peripheral plate 27 has a semi-cylindrical shape having a semi-cylindrical shape on an upper side. A lower edge of the side peripheral plate 27 forms a part of the edge of the exhaust port 28.

The exhaust casing 23 of the first steam turbine section 10*a* and the exhaust casing 23 of the second steam turbine section 10*b* are connected to each other and are integrated with each other.

The steam flows from the steam inlet duct 19 into a steam flow path FP of the first steam turbine section 10*a* and into a steam flow path FP of the second steam turbine section 10*b*. Here, the steam flow path FP of each of the steam turbine sections 10*a* and 10*b* has an annular cross-sectional shape perpendicular to the axis Ar and is long in the axis direction Da. An inner peripheral side edge of the steam flow path FP is defined by the rotor shaft 12, the inner vane ring 17*i*, and the like. Additionally, an outer peripheral side edge of the steam flow path FP is defined by the outer vane ring 17*o*, the connecting ring 25, and the like.

The steam that has flowed into the steam flow path FP of each of the steam turbine sections 10*a* and 10*b* applies a rotational force around the axis Ar to a plurality of rotor blades present in the steam flow path FP to rotate the rotor 11. The steam that has rotated the rotor 11 is exhausted from the exhaust port 28 into the condenser Co through the diffuser space 24*s* and the exhaust space 23*s*. The steam exhausted into the condenser Co is cooled by heat exchange with a cooling medium and is converted back to water which is a liquid.

Meanwhile, the dryness of the steam, which has flowed into the steam flow path FP, gradually decreases as the steam flows through the steam flow path FP to the axial downstream side Dad. For this reason, the steam drain may adhere to the surfaces of the plurality of stator vanes constituting the stator vane row 17*s* on the axial downstream side Dad, among the plurality of stator vane rows 17*s*. There is a case where some of the steam drain flows as water droplets to the axial downstream side Dad and collides with surfaces of a plurality of rotor blades constituting the rotor blade row 13 present on the axial downstream side Dad of the stator vane row 17*s* to damage the rotor blades. For this reason, the steam turbine ST of the present embodiment includes a mechanism that recovers the steam drain. This mechanism is incorporated in a final-stage stator vane segment 60 most downstream on the axial downstream side Dad among the plurality of stator vane segments 17, and in the inner casing 30. Hereinafter, this mechanism will be described in detail.

First Embodiment of Inner Casing and Stator Vane Segment

Figure 2:
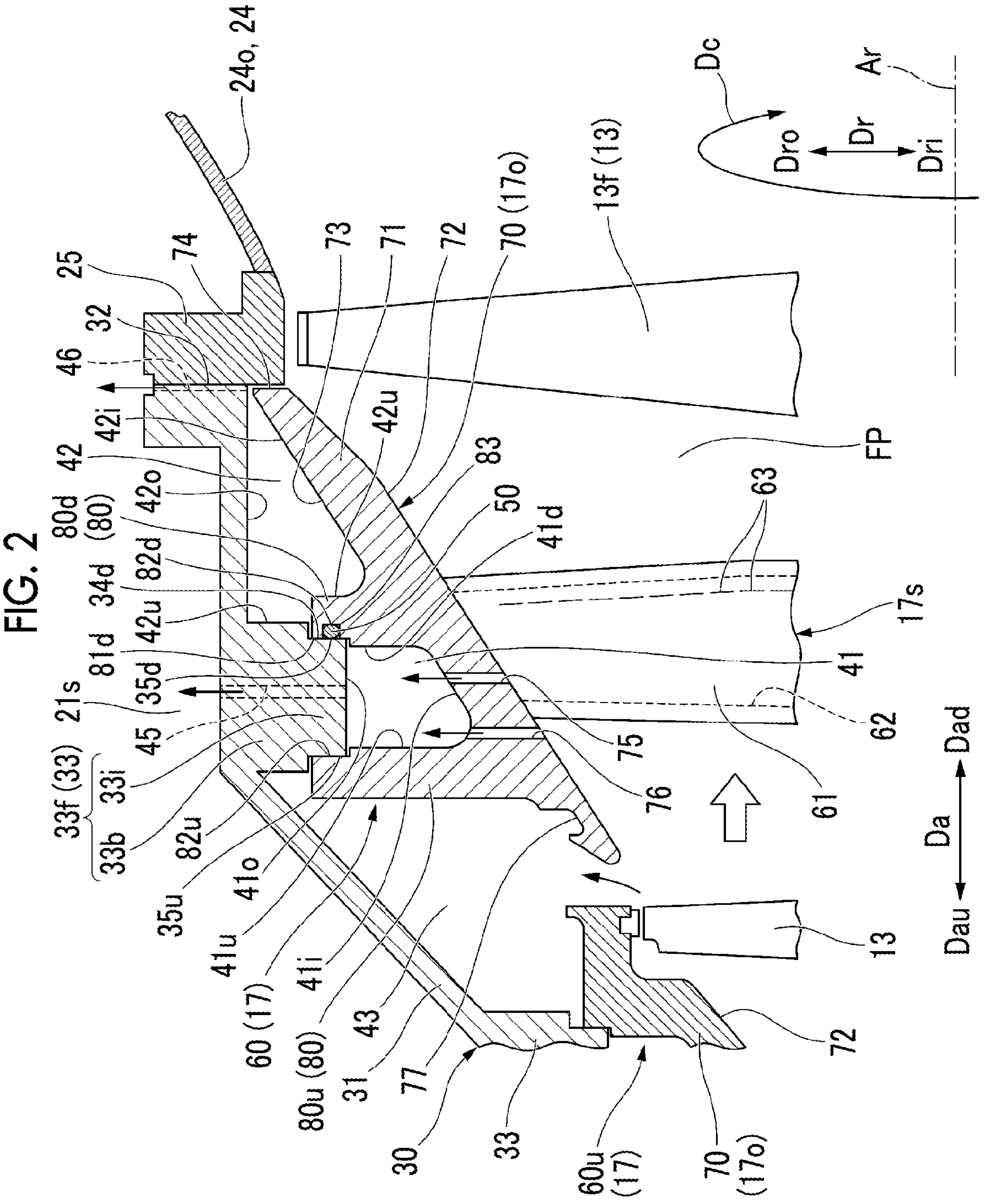
FIG. 2 is a cross-sectional view of a principal portion of an inner casing and a stator vane segment in a first embodiment according to the present disclosure.

The inner casing and the final-stage stator vane segment of the present embodiment will be described mainly with reference to FIG. 2.

As previously mentioned with reference to FIG. 1, the final-stage stator vane segment 60 of the present embodiment includes one stator vane row 17*s*, the inner vane ring 17*i* attached to the radial inner side Dri of the one stator vane row 17*s*, and an outer vane ring 70 (170) attached to the radial outer side Dro of the one stator vane row 173. As shown in FIG. 2, the final-stage stator vane segment 60 further includes a sealing member 50.

Each of the plurality of stator vanes 61 constituting the stator vane row 17*s* in the final-stage stator vane segment 60 extends in the radial direction Dr and has a vane shape having a cross-sectional shape perpendicular to the radial direction Dr. Each stator vane 61 has a cavity 62 formed inside the stator vane 61, and a vane surface drain passage 63 through which a vane surface, which is the surface of the stator vane 61, and the cavity 62 communicate with each other.

The outer vane ring 70 has a vane ring body 71 and two vane ring protrusions 80. The vane ring body 71 has a gas path surface 72 that extends in the circumferential direction Dc and that faces the radial inner side Dri, a counter gas path surface 73 that extends in the circumferential direction Dc and that has a back-to-back relationship with the gas path surface 72, a vane ring rear end surface 74 that faces the axial downstream side Dad, a vane surface drain recovery passage 75, a gas path surface drain recovery passage 76, and a drain groove 77. The vane ring rear end surface 74 of the vane ring body 71 faces the connecting ring 25 in the axis direction Da at an interval therefrom in the axis direction Da.

The two vane ring protrusions 80 protrude from the counter gas path surface 73 of the vane ring body 71 to the radial outer side Dro, extend in the circumferential direction Dc, and face each other at an interval from each other in the axis direction Da. Here, the vane ring protrusion 80 on the axial upstream side Dau out of the two vane ring protrusions 80 is referred to as an upstream vane ring protrusion (the other vane ring protrusion) 80*u*, and the vane ring protrusion 80 on the axial downstream side Dad is referred to as a downstream vane ring protrusion (one vane ring protrusion) 80*d*. The outer vane ring 70 cooperates with the inner casing 30 to form a first drain recovery space (or simply a drain recovery space) 41 between the two vane ring protrusions 80 in the axis direction Da. Additionally, the outer vane ring 70 cooperates with the inner casing 30 to form a second drain recovery space 42 in a portion on the axial downstream side Dad with respect to the downstream vane ring protrusion 80*d*. An inner first space defining surface 41*i* that defines an inner peripheral side edge of the first drain recovery space 41 is formed between the two vane ring protrusions 80 in the counter gas path surface 73 of the vane ring body 71. Additionally, a portion of the counter gas path surface 73 of the vane ring body 71 on the axial downstream side Dad with respect to the downstream vane ring protrusion 80*d* forms an inner second space defining surface 42*i* that defines an inner peripheral side edge of the second drain recovery space 42.

The vane surface drain recovery passage 75 of the vane ring body 71 extends from the cavity 62 of the stator vane 61 toward the radial outer side Dro and is open at the inner first space defining surface 41*i*. That is, the vane surface drain recovery passage 75 allows the cavity 62 of the stator vane 61 and the first drain recovery space 41 to communicate with each other. The gas path surface drain recovery passage 76 extends from the position of the gas path surface 72 on the axial upstream side Dau with respect to the stator vane 61 toward the radial outer side Dro and is open at the inner first space defining surface 41*i*. That is, the gas path surface drain recovery passage 76 allows the steam flow path FP present on the radial inner side Dri of the vane ring body 71 and the first drain recovery space 41 to communicate with each other. The drain groove 77 is a groove that is recessed from the counter gas path surface 73 to the radial inner side Dri and extends in the circumferential direction Dc, at a position of the counter gas path surface 73 on the axial upstream side Dau with respect to the upstream vane ring protrusion 80*u*.

The upstream vane ring protrusion 80*u* has a vane ring upstream-side sealing surface 82*u* and an upstream first space defining surface 41*u* that face the axial downstream side Dad. The upstream first space defining surface 41*u* is located on the radial inner side Dri and on the axial downstream side Dad with respect to the vane ring upstream-side sealing surface 82*u*. Thus, the vane ring upstream-side sealing surface 82*u* has a step in the axis direction Da with respect to the upstream first space defining surface 41*u*. The downstream vane ring protrusion 80*d* has a vane ring downstream-side facing surface 81*d* and a downstream first space defining surface 41*d* that face the axial upstream side Dau, and an upstream second space defining surface 42*u* that faces the axial downstream side Dad. The downstream first space defining surface 41*d* is located on the radial inner side Dri and on the axial upstream side Dau with respect to the vane ring downstream-side facing surface 81*d*. Thus, the vane ring downstream-side facing surface 81*d* has a step in the axis direction Da with respect to the downstream first space defining surface 41*d*. The downstream vane ring protrusion 80*d* further has a seal groove 83. The seal groove 83 is recessed from the vane ring downstream-side facing surface 81*d* to the axial downstream side Dad and extends in the circumferential direction Dc. A bottom surface of the seal groove 83 forms a vane ring downstream-side sealing surface (or simply a sealing surface) 82*d* that extends in the circumferential direction Dc toward the axial upstream side Dau.

The inner casing 30 includes a casing body 31 that extends in the circumferential direction Dc around an axis and that covers an outer peripheral side of the plurality of stator vane segments 17, a plurality of casing protrusions 33 that protrude from the casing body 31 to the radial inner side Dri and extend in the circumferential direction Dc, a first drain discharge passage 45, and a second drain discharge passage 46. The plurality of casing protrusions 33 are aligned in the axis direction Da at intervals from each other. The casing protrusion 33 most downstream on the axial downstream side Dad among the plurality of casing protrusions 33 forms a final-stage protrusion 33*f*.

In a surface of the casing body 31 facing the radial inner side Dri, a portion on the axial downstream side Dad with respect to the final-stage protrusion 33*f* forms an outer second space defining surface 42*o*. A surface of the casing body 31 facing the axial downstream side Dad forms a casing rear end surface 32. The casing rear end surface 32 faces the connecting ring 25 in the axis direction Da. The second drain discharge passage 46 is a groove that is recessed from the casing rear end surface 32 toward the axial upstream side Dau and extends in the radial direction Dr. The second drain discharge passage 46 is open at the outer second space defining surface 42*o* which is a part of a surface of the casing body 31 facing the radial inner side Dri, and is open at a surface of the casing body 31 facing the radial outer side Dro.

The final-stage protrusion 33*f* has a convex base portion 33*b* and an entry portion 33*i*. The convex base portion 33*b* protrudes from the casing body 31 to the radial inner side Dri. The entry portion 33*i* protrudes from the convex base portion 33*b* to the radial inner side Dri and enters between the two vane ring protrusions 80.

A surface of the entry portion 33*i* facing the axial upstream side Dau forms a casing upstream-side sealing surface 35*u* facing the vane ring upstream-side sealing surface 82*u* of the upstream vane ring protrusion 80*u* in the axis direction Da. The casing upstream-side sealing surface 35*u* is located on the axial downstream side Dad with respect to a surface of the convex base portion 33*b* facing the axial upstream side Dau. Thus, the casing upstream-side sealing surface 35*u* has a step in the axis direction Da with respect to the surface of the convex base portion 33*b* facing the axial upstream side Dau. A surface of the entry portion 33*i* facing the axial downstream side Dad forms a casing downstream-side facing surface 34*d* facing the vane ring downstream-side facing surface 81*d* of the downstream vane ring protrusion 80*d* in the axis direction Da. A portion of the casing downstream-side facing surface 34*d* facing the vane ring downstream-side sealing surface 82*d*, which is the bottom surface of the seal groove 83, in the axis direction Da forms a casing downstream-side sealing surface 35*d*. A surface of the convex base portion 33*b* facing the axial downstream side Dad forms the upstream second space defining surface 42*u*. The casing downstream-side facing surface 34*d* is located on the axial upstream side Dau with respect to the upstream second space defining surface 42*u* of the convex base portion 33*b*. Thus, the casing downstream-side facing surface 34*d* has a step in the axis direction Da with respect to the upstream second space defining surface 42*u*. A surface of the entry portion 33*i* facing the radial inner side Dri forms an outer first space defining surface 41*o*. The first drain discharge passage 45 penetrates the final-stage protrusion 33*f* and the casing body 31 in the radial direction Dr. For this reason, the first drain discharge passage 45 is open at the outer first space defining surface 410 of the entry portion 33*i* and is open at a surface of the casing body 31 facing the radial outer side Dro.

The first drain recovery space 41 is an annular space defined by the inner first space defining surface 41*i*, the outer first space defining surface 41*o*, the upstream first space defining surface 41*u*, and the downstream first space defining surface 41*d*. Additionally, the second drain recovery space 42 is an annular space defined by the inner second space defining surface 42*i*, the outer second space defining surface 42*o*, and the upstream second space defining surface 42*u*. The steam turbine of the present embodiment further has a third drain recovery space 43. The third drain recovery space 43 is a space surrounded by the outer vane ring 70 of an upstream stator vane segment 60*u* which is the stator vane segment 17 adjacent to the axial upstream side Dau of the final-stage stator vane segment 60, the upstream vane ring protrusion 80*u* of the outer vane ring 70 of the final-stage stator vane segment 60, a portion of the vane ring body 71 of the outer vane ring 70 of the final-stage stator vane segment 60 on the axial upstream side Dau with respect to the upstream vane ring protrusion 80*u*, and the inner casing 30. In addition, the drain groove 77 defines a part of the edge of the third drain recovery space 43.

The sealing member 50 enters the seal groove 83 of the outer vane ring 70. The sealing member 50 comes into contact with the vane ring downstream-side sealing surface 82*d*, which is the bottom surface of the seal groove 83, and the casing downstream-side sealing surface 35*d*. The sealing member 50 is a member different from the outer vane ring 70 and the inner casing 30. That is, the sealing member 50 may not be integrated with the outer vane ring 70 or with the inner casing 30.

There is a case where the steam that has passed between the outer vane ring 70 and the inner vane ring 17*i* of the upstream stator vane segment 60*u* adjacent to the axial upstream side Dau of the final-stage stator vane segment 60 contains a small amount of steam drain. There is a case where the steam drain adheres to the gas path surface 72 of the outer vane ring 70 of the upstream stator vane segment 60*u*. Additionally, there is a case where the steam drain adheres to blade surfaces of the plurality of rotor blades constituting the rotor blade row 13 located on the axial downstream side Dad with respect to the stator vane row 17*s* of the upstream stator vane segment 60*u* and located on the axial upstream side Dau with respect to the stator vane row 17*s* of the final-stage stator vane segment 60. Some of the steam drain, together with the steam, flows into the third drain recovery space 43 from between the outer vane ring 70 of the upstream stator vane segment 60*u* and the outer vane ring 70 of the final-stage stator vane segment 60. The steam drain that has flowed into the third drain recovery space 43 is accumulated in the drain groove 77 formed in the outer vane ring 70 of the final-stage stator vane segment 60. The steam drain accumulated in the drain groove 77 located above the axis Ar flows downward in the drain groove 77. Then, the steam drain flows into the casing inner space 21*s* between the inner casing 30 and the outer casing 21 from a third drain discharge passage 47 (see FIG. 1) formed at a position directly below the axis Ar in the inner casing 30. The steam drain that has flowed into the casing inner space 21*s* is discharged to the exhaust space 23*s* through the drain discharge passage 22 (see FIG. 1) formed in the outer casing 21. The exhausted steam drain in the exhaust space 23*s* flows into the condenser Co through the exhaust port 28 together with the steam flowing through the exhaust space 23*s*.

There is a case where the steam drain adheres to the vane surfaces of the plurality of stator vanes 61 constituting the stator vane row 17*s* of the final-stage stator vane segment 60. The steam drain flows into the cavity 62 formed inside the stator vane 61 through a plurality of vane surface drain passages 63 formed in the stator vane 61. The steam drain that has flowed into the cavity 62 flows into the first drain recovery space 41 through the vane surface drain recovery passage 75 of the outer vane ring 70.

There is a case where the steam drain adheres to the gas path surface 72 of the outer vane ring 70 of the final-stage stator vane segment 60. In the steam drain, the steam drain present on the axial upstream side Dau with respect to the stator vane 61 flows into the first drain recovery space 41 through the gas path surface drain recovery passage 76 formed in the outer vane ring 70.

The steam drain that has flowed into the first drain recovery space 41 flows into the casing inner space 21*s* between the inner casing 30 and the outer casing 21 through the first drain discharge passage 45 formed in the inner casing 30. The steam drain that has flowed into the casing inner space 21*s* is discharged to the exhaust space 23*s* through the drain discharge passage 22 formed in the outer casing 21, similarly to the steam drain that has flowed into the third drain recovery space 43. The exhausted steam drain in the exhaust space 23*s* flows into the condenser Co through the exhaust port 28 together with the steam flowing through the exhaust space 23*s*.

The steam drain which has adhered to a region on the axial downstream side Dad with respect to the gas path surface drain recovery passage 76 in the gas path surface 72 of the outer vane ring 70 of the final-stage stator vane segment 60 flows into the second drain recovery space 42 through a space between the vane ring rear end surface 74 of the outer vane ring 70 and the connecting ring 25. The steam drain that has flowed into the second drain recovery space 42 flows into the casing inner space 21*s* between the inner casing 30 and the outer casing 21 through the second drain discharge passage 46 formed in the inner casing 30. The steam drain that has flowed into the casing inner space 21*s* is discharged to the exhaust space 23*s* through the drain discharge passage 22 formed in the outer casing 21, similarly to the steam drain that has flowed into the third drain recovery space 43 and the first drain recovery space 41. The exhausted steam drain in the exhaust space 23*s* flows into the condenser Co through the exhaust port 28 together with the steam flowing through the exhaust space 23*s*.

The final-stage stator vane segment 60 receives a force directed to the axial downstream side Dad from the steam flowing through the steam flow path FP during the driving of the steam turbine ST. For this reason, the final-stage stator vane segment 60 tends to move to the axial downstream side Dad relative to the inner casing 30. Thus, the vane ring upstream-side sealing surface 82*u* moves to the axial downstream side Dad with respect to the casing upstream-side sealing surface 35*u* and comes into contact with the casing upstream-side sealing surface 35*u*. Additionally, the vane ring upstream-side sealing surface 82*u* has a step in the axis direction Da with respect to the upstream first space defining surface 41*u*, and a gap between the vane ring upstream-side sealing surface 82*u* and the casing upstream-side sealing surface 35*u* does not directly face the first drain recovery space 41.

Therefore, in the present embodiment, the sealing performance between the final-stage protrusion 33*f* and the upstream vane ring protrusion 80*u* during the driving of the steam turbine ST is high, and steam leakage from between the final-stage protrusion 33*f* and the upstream vane ring protrusion 80*u* can be suppressed. In other words, even when there is a pressure difference between the first drain recovery space 41 and the third drain recovery space 43 located on the axial upstream side Dau of the first drain recovery space 41, this pressure difference can be maintained.

When the steam turbine ST is driven, the vane ring downstream-side facing surface 81*d* moves to the axial downstream side Dad with respect to the casing downstream-side facing surface 34*d*, and the vane ring downstream-side facing surface 81*d* is separated from the casing downstream-side facing surface 34*d*. However, the sealing member 50 inside the seal groove 83 maintains the contact between the vane ring downstream-side sealing surface 82*d*, which is the bottom surface of the seal groove 83, and the casing downstream-side sealing surface 35*d*, which is a part of the casing downstream-side facing surface 34*d*. Additionally, the vane ring downstream-side facing surface 81*d* has a step in the axis direction Da with respect to the downstream first space defining surface 41*d*, and a gap between the vane ring downstream-side facing surface 81*d* and the casing downstream-side facing surface 34*d* does not directly face the first drain recovery space 41.

Therefore, in the present embodiment, the sealing performance between the final-stage protrusion 33*f* and the downstream vane ring protrusion 80*d* during the driving of the steam turbine ST is high, and steam leakage from between the final-stage protrusion 33*f* and the downstream vane ring protrusion 80*d* can be suppressed. In other words, even when there is a pressure difference between the first drain recovery space 41 and the second drain recovery space 42 located on the axial downstream side Dad of the first drain recovery space 41, this pressure difference can be maintained.

However, the third drain recovery space 43, the first drain recovery space 41, and the second drain recovery space 42 are aligned in the above order from the axial upstream side Dau toward the axial downstream side Dad. For this reason, the pressure of the steam flowing into the third drain recovery space 43 is higher than the pressure of the steam flowing into the first drain recovery space 41. Additionally, the pressure of the steam flowing into the first drain recovery space 41 is higher than the pressure of the steam flowing into the second drain recovery space 42.

In the present embodiment, as previously mentioned, the sealing performance between the final-stage protrusion 33*f* and the upstream vane ring protrusion 80_u_ is high. Thus, even when there is a pressure difference between the first drain recovery space 41 and the third drain recovery space 43 located on the axial upstream side Dau of the first drain recovery space 41, this pressure difference can be maintained. For this reason, in the present embodiment, the pressure inside the third drain recovery space 43 can be maintained at a pressure higher than the pressure inside the first drain space.

Additionally, in the present embodiment, as previously mentioned, the sealing performance between the final-stage protrusion 33_f_ and the downstream vane ring protrusion 80_d_ is high. Therefore, even when there is a pressure difference between the first drain recovery space 41 and the second drain recovery space 42 located on the axial downstream side Dad of the first drain recovery space 41, this pressure difference can be maintained. For this reason, in the present embodiment, the pressure inside the first drain recovery space 41 can be maintained to be higher than the pressure inside the second drain recovery space 42.

It is assumed that the sealing performance between the final-stage protrusion 33_f_ and the upstream vane ring protrusion 80_u_ is low and the pressure in the third drain recovery space 43 cannot be maintained to be higher than the pressure in the first drain space. In this case, compared to a case where the sealing performance between the final-stage protrusion 33_f_ and the upstream vane ring protrusion 80_u_ is higher, the pressure in the third drain recovery space 43 becomes lower and the pressure in the first drain recovery space 41 becomes higher. For this reason, in this case, a large amount of non-drained steam flows into the third drain recovery space 43 and the steam is wastefully consumed, and the inflow amount of the steam drain into the first drain recovery space 41 is reduced. When the flow rate of the steam flowing into each of the drain recovery spaces 43 and 41 is increased in order to increase the inflow amount of the steam drain flowing into the first drain recovery space 41, the flow rate of the steam that is wastefully consumed increases.

On the other hand, in the present embodiment, as previously mentioned, since the sealing performance between the final-stage protrusion 33_f_ and the upstream vane ring protrusion 80_u_ is high, the steam drain can be guided to the third drain recovery space 43 and the first drain recovery space 41 while suppressing the exhaust of the steam that has not been drained.

Additionally, it is assumed that the sealing performance between the final-stage protrusion 33_f_ and the downstream vane ring protrusion 80_d_ is low and that the pressure inside the first drain recovery space 41 cannot be maintained at a pressure higher than the pressure inside the second drain recovery space 42. In this case, compared to a case where the sealing performance between the final-stage protrusion 33_f_ and the downstream vane ring protrusion 80_d_ is higher, the pressure in the first drain recovery space 41 becomes lower and the pressure in the second drain recovery space 42 becomes higher. For this reason, in this case, a large amount of non-drained steam flows into the first drain recovery space 41 and the steam is wastefully consumed, and the inflow amount of the steam drain into the second drain recovery space 42 is reduced. When the flow rate of the steam flowing into each of the drain recovery spaces 41 and 42 is increased in order to increase the inflow amount of the steam drain flowing into the second drain recovery space 42, the flow rate of the steam that is wastefully consumed increases.

However, in the present embodiment, as previously mentioned, since the sealing performance between the final-stage protrusion 33_f_ and the downstream vane ring protrusion 80_d_ is high, the steam drain can be guided to the first drain recovery space 41 and the second drain recovery space 42 while suppressing the exhaust of the steam that has not been drained.

Thus, in the present embodiment, the recovery efficiency of the steam drain into the third drain recovery space 43, the first drain recovery space 41, and the second drain recovery space 42 can be improved.

Second Embodiment of Inner Casing and Stator Vane Segment

Figure 3:
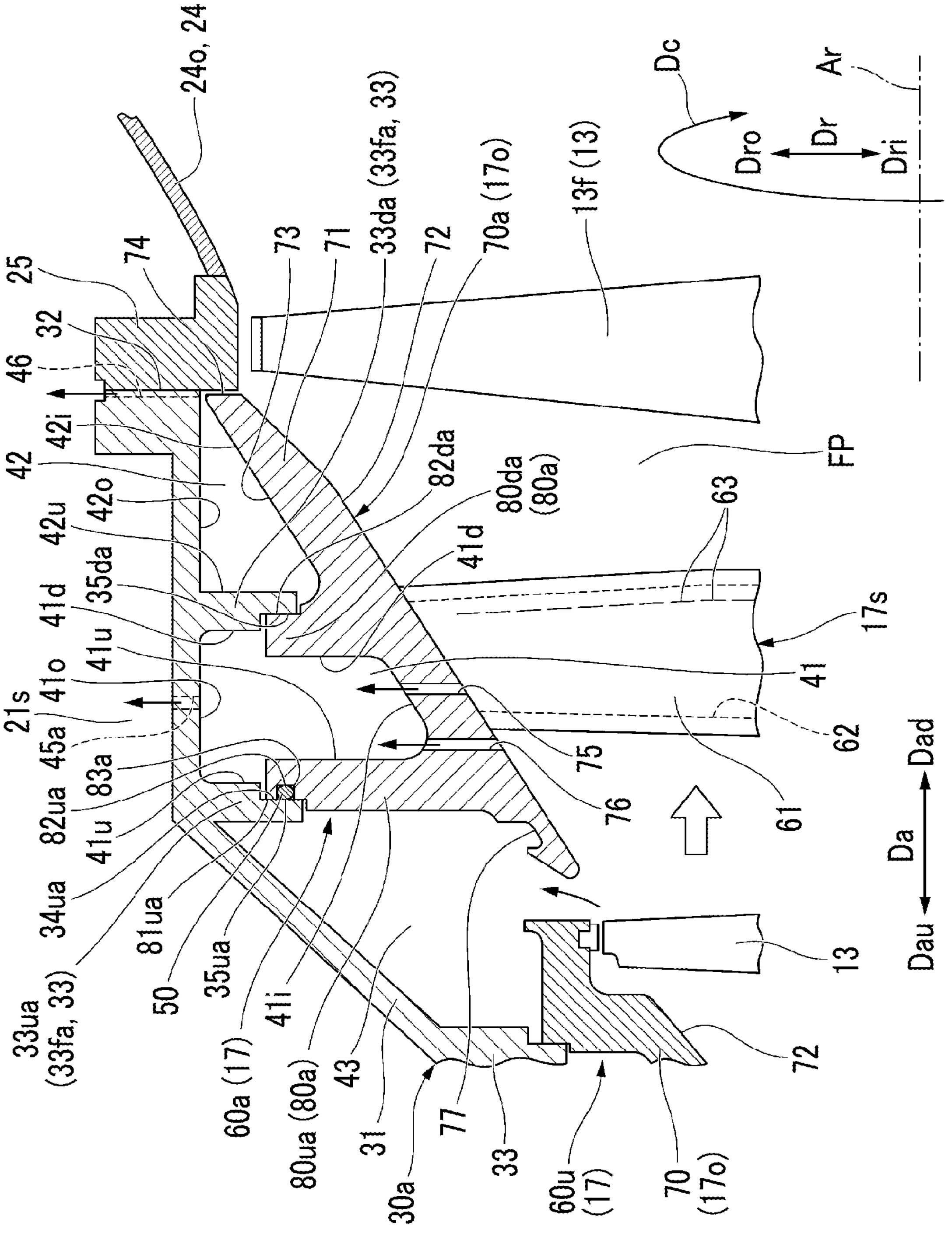
FIG. 3 is a cross-sectional view of a principal portion of an inner casing and a stator vane segment according to a second embodiment of the present disclosure.

The inner casing and the stator vane segment of the present embodiment will be described mainly with reference to FIG. 3.

As previously mentioned with reference to FIG. 1, a final-stage stator vane segment 60_a_ of the present embodiment includes one stator vane row 17_s_, the inner vane ring 17_i_ attached to the radial inner side Dri of the one stator vane row 17_s_, and an outer vane ring 70_a_ (170) attached to the radial outer side Dro of the one stator vane row 17_s_. As shown in FIG. 3, the final-stage stator vane segment 60_a_ further includes a sealing member 50.

Each of the plurality of stator vanes 61 constituting the stator vane row 17_s_ in the final-stage stator vane segment 60_a_ has the cavity 62 and the vane surface drain passage 63, similarly to the stator vane 61 of the first embodiment.

The outer vane ring 70_a_ has the vane ring body 71 and two vane ring protrusions 80_a_. Similarly to the first embodiment, the vane ring body 71 has the gas path surface 72 that extends in the circumferential direction Dc and faces the radial inner side Dri, the counter gas path surface 73 that extends in the circumferential direction Dc and has a back-to-back relationship with the gas path surface 72, the vane ring rear end surface 74 that faces the axial downstream side Dad, the vane surface drain recovery passage 75, the gas path surface drain recovery passage 76, and the drain groove 77.

Similarly to the first embodiment, the two vane ring protrusions 80_a_ protrude from the counter gas path surface 73 of the vane ring body 71 to the radial outer side Dro, extend in the circumferential direction Dc, and face each other at an interval from each other in the axis direction Da. The outer vane ring 70_a_ cooperates with the inner casing 30 to form the first drain recovery space 41 between the two vane ring protrusions 80_a_ in the axis direction Da. Additionally, the outer vane ring 70_a_ cooperates with the inner casing 30 to form the second drain recovery space 42 in a portion on the axial downstream side Dad with respect to a downstream vane ring protrusion 80_da_. The inner first space defining surface 41_i_ that defines an inner peripheral side edge of the first drain recovery space 41 is formed between the two vane ring protrusions 80_a_ in the counter gas path surface 73 of the vane ring body 71. Additionally, a portion of the counter gas path surface 73 of the vane ring body 71 on the axial downstream side Dad with respect to the downstream vane ring protrusion 80_da_ forms the inner second space defining surface 42_i_ that defines an inner peripheral side edge of the second drain recovery space 42.

An upstream vane ring protrusion 80_ua_ of the two vane ring protrusions 80_a_ has a vane ring upstream-side facing surface 82_ua_ facing the axial upstream side Dau and the upstream first space defining surface 41_u_ facing the axial downstream side Dad. The upstream vane ring protrusion 80*ua* further has a seal groove 83*a*. The seal groove 83*a* is recessed from the vane ring upstream-side facing surface 81*ua* to the axial downstream side Dad and extends in the circumferential direction Dc. A bottom surface of the seal groove 83*a* forms a vane ring upstream-side sealing surface 82*ua* that extends in the circumferential direction Dc toward the axial upstream side Dau. The downstream vane ring protrusion 80*da* of the two vane ring protrusions 80*a* has a vane ring downstream-side sealing surface 82*da* facing the axial downstream side Dad and a downstream first space defining surface 41*d* facing the axial upstream side Dau.

Similarly to the first embodiment, the inner casing 30*a* includes the casing body 31 that extends in the circumferential direction Dc around an axis and that covers the outer peripheral side of the plurality of stator vane segments 17, the plurality of casing protrusions 33 that protrude from the casing body 31 to the radial inner side Dri and that extend in the circumferential direction Dc, a first drain discharge passage 45*a*, and the second drain discharge passage 46. The plurality of casing protrusions 33 are aligned in the axis direction Da at intervals from each other. However, in the present embodiment, among the plurality of casing protrusions 33, the casing protrusion 33 most downstream on the axial downstream side Dad and the casing protrusion 33 adjacent to the casing protrusion 33 form a final-stage protrusion 33*fa*. Out of the two casing protrusions 33 constituting the final-stage protrusion 33*fa*, the casing protrusion 33 on the axial upstream side Dau forms a final-stage upstream protrusion 33*ua*, and the casing protrusion 33 on the axial downstream side Dad forms a final-stage downstream protrusion 33*da*.

An outer first space defining surface 41*o* is formed between the final-stage upstream protrusion 33*ua* and the final-stage downstream protrusion 33*da* in a surface of the casing body 31 facing the radial inner side Dri. Additionally, in a surface of the casing body 31 facing the radial inner side Dri, a portion on the axial downstream side Dad with respect to the final-stage downstream protrusion 33*da* forms an outer second space defining surface 42*o*. A surface of the casing body 31 facing the axial downstream side Dad forms a casing rear end surface 32. Similarly to the first embodiment, the casing rear end surface 32 faces the connecting ring 25 in the axis direction Da. Similarly to the first embodiment, the second drain discharge passage 46 is a groove that is recessed from the casing rear end surface 32 toward the axial upstream side Dau and extends in the radial direction Dr.

The final-stage upstream protrusion 33*ua* has a casing upstream-side facing surface 34*ua* and the upstream first space defining surface 41*u* that face the axial downstream side Dad. The casing upstream-side facing surface 34*ua* faces the vane ring upstream-side facing surface 81*ua* in the axis direction Da. A portion of the casing upstream-side facing surface 34*ua* facing the vane ring upstream-side sealing surface 82*ua* forms a casing upstream-side sealing surface 35*ua*. The upstream first space defining surface 41*u* is located on the radial outer side Dro and on the axial downstream side Dad with respect to the casing upstream-side facing surface 34*ua*. The final-stage downstream protrusion 33*da* has a casing downstream-side sealing surface 35*da* and the downstream first space defining surface 41*d* that face the axial upstream side Dau, and the upstream second space defining surface 42*u* facing the axial downstream side Dad. The casing downstream-side sealing surface 35*da* faces the vane ring downstream-side sealing surface 82*da* in the axis direction Da so as to be capable of coming into contact with the casing downstream-side sealing surface 82*da*. A downstream first space facing surface is located on the radial outer side Dro and on the axial upstream side Dau with respect to the casing downstream-side sealing surface 35*da*.

The first drain discharge passage 45*a* penetrates the casing body 31 in the radial direction Dr between the final-stage upstream protrusion 33*ua* and the final-stage downstream protrusion 33*da*. For this reason, the first drain discharge passage 45*a* is open at the outer first space defining surface 41*o* and is open at the surface of the casing body 31 facing the radial outer side Dro.

The first drain recovery space 41 is an annular space defined by the inner first space defining surface 41*i*, the outer first space defining surface 41*o*, the upstream first space defining surface 41*u*, and the downstream first space defining surface 41*d*. Additionally, the second drain recovery space 42 is an annular space defined by the inner second space defining surface 42*i*, the outer second space defining surface 42*o*, and the upstream second space defining surface 42*u*. The steam turbine ST of the present embodiment further has the third drain recovery space 43. Similar to the first embodiment, the third drain recovery space 43 is a space surrounded by the outer vane ring 70 of the upstream stator vane segment 60*u* which is the stator vane segment 17 adjacent to the axial upstream side Dau of the final-stage stator vane segment 60*a*, the upstream vane ring protrusion 80*ua* of the outer vane ring 70*a* of the final-stage stator vane segment 60*a*, the portion of the vane ring body 71 of the outer vane ring 70*a* of the final-stage stator vane segment 60*a* on the axial upstream side Dau with respect to the upstream vane ring protrusion 80*ua*, and the inner casing 30*a*.

The sealing member 50 enters the seal groove 83*a* of the outer vane ring 70*a*. The sealing member 50 comes into contact with the vane ring upstream-side sealing surface 82*ua*, which is the bottom surface of the seal groove 83*a*, and the casing upstream-side sealing surface 35*ua*. Similar to the first embodiment, the sealing member 50 is a member different from the outer vane ring 70*a* and the inner casing 30*a*.

Also in the present embodiment, similarly to the first embodiment, the steam and the steam drain in the steam flow path FP flow into the third drain recovery space 43 from between the outer vane ring 70 of the upstream stator vane segment 60*u* and the outer vane ring 70*a* of the final-stage stator vane segment 60*a*. The steam drain that has flowed into the third drain recovery space 43 is accumulated in the drain groove 77 formed in the outer vane ring 70*a* of the final-stage stator vane segment 60*a*. The steam drain accumulated in the drain groove 77 located above the axis Ar flows downward in the drain groove 77. Then, the steam drain flows into the casing inner space 21*s* between the inner casing 30*a* and the outer casing 21 from a third drain discharge passage 47 (see FIG. 1) formed at a position directly below the axis Ar in the inner casing 30*a*. The steam drain that has flowed into the casing inner space 21*s* is discharged to the exhaust space 233 through the drain discharge passage 22 formed in the outer casing 21. The exhausted steam drain in the exhaust space 23*s* flows into the condenser Co through the exhaust port 28 together with the steam flowing through the exhaust space 23*s*.

Similarly to the first embodiment, also in the present embodiment, the steam drain which has adhered to the vane surfaces of the plurality of stator vanes 61 constituting the stator vane rows 17*s* of the final-stage stator vane segment 60*a* flows into the cavity 62 formed inside the stator vane 61 through the plurality of vane surface drain passages 63 formed on the stator vane 61. The steam drain that has flowed into the cavity 62 flows into the first drain recovery space 41 through the vane surface drain recovery passage 75 of the outer vane ring 70*a*.

There is a case where the steam drain adheres to the gas path surface 72 of the outer vane ring 70*a* of the final-stage stator vane segment 60*a*. Similarly to the first embodiment, of the steam drain, the steam drain present on the axial upstream side Dau with respect to the stator vane 61 flows into the first drain recovery space 41 through the gas path surface drain recovery passage 76 formed in the outer vane ring 70*a*.

Similarly to the first embodiment, the steam drain that has flowed into the first drain recovery space 41 flows into the casing inner space 21*s* between the inner casing 30*a* and the outer casing 21 through the first drain discharge passage 45*a* formed in the inner casing 30*a*. The steam drain that has flowed into the casing inner space 21*s* is discharged to the exhaust space 233 through the drain discharge passage 22 (see FIG. 1) formed in the outer casing 21. The exhausted steam drain in the exhaust space 23*s* flows into the condenser Co through the exhaust port 28 together with the steam flowing through the exhaust space 23*s*.

Similarly to the first embodiment, the steam drain, which has adhered to a region on the axial downstream side Dad with respect to the gas path surface drain recovery passage 76 in the gas path surface 72 of the outer vane ring 70*a* of the final-stage stator vane segment 60*a* flows into the second drain recovery space 42 through a space between the vane ring rear end surface 74 of the outer vane ring 70*a* and the connecting ring 25. The steam drain that has flowed into the second drain recovery space 42 flows into the casing inner space 21*s* between the inner casing 30*a* and the outer casing 21 through the second drain discharge passage 46 formed in the inner casing 30*a*. The steam drain that has flowed into the casing inner space 21*s* is discharged to the exhaust space 23*s* through the drain discharge passage 22 formed in the outer casing 21, similarly to the steam drain that has flowed into the third drain recovery space 43 and the first drain recovery space 41. The exhausted steam drain in the exhaust space 23*s* flows into the condenser Co through the exhaust port 28 together with the steam flowing through the exhaust space 23*s*.

Also in the present embodiment, similarly to the first embodiment, the final-stage stator vane segment 60*a* receives a force directed to the axial downstream side Dad from the steam flowing through the steam flow path FP during the driving of the steam turbine ST. For this reason, the final-stage stator vane segment 60*a* tends to move to the axial downstream side Dad relative to the inner casing 30*a*. Thus, the vane ring downstream-side sealing surface 82*da* moves to the axial downstream side Dad with respect to the casing downstream-side sealing surface 35*da* and comes into contact with the casing downstream-side sealing surface 35*da*. Therefore, the sealing performance between the final-stage downstream protrusion 33*da* and the downstream vane ring protrusion 80*da* during the driving of the steam turbine ST is high, and steam leakage from between the final-stage downstream protrusion 33*da* and the downstream vane ring protrusion 80*da* can be suppressed. In other words, even when there is a pressure difference between the first drain recovery space 41 and the second drain recovery space 42 located on the axial downstream side Dad of the first drain recovery space 41, this pressure difference can be maintained.

Additionally, when the steam turbine ST is driven, the vane ring upstream-side facing surface 81*ua* moves to the axial downstream side Dad with respect to the casing upstream-side facing surface 34*ua*, and the vane ring upstream-side facing surface 81*ua* is separated from the casing upstream-side facing surface 34*ua*. However, the sealing member 50 inside the seal groove 83*a* maintains the contact between the vane ring upstream-side sealing surface 82*ua*, which is the bottom surface of the seal groove 83*a*, and the casing upstream-side sealing surface 35*ua*, which is a part of the casing upstream-side facing surface 34*ua*. Therefore, the sealing performance between the final-stage upstream protrusion 33*ua* and the upstream vane ring protrusion 80*ua* during the driving of the steam turbine ST is high, and steam leakage from between the final-stage upstream protrusion 33*ua* and the upstream vane ring protrusion 80*ua* can be suppressed. In other words, even when there is a pressure difference between the first drain recovery space 41 and the third drain recovery space 43 located on the axial upstream side Dau of the first drain recovery space 41, this pressure difference can be maintained.

Meanwhile, similarly to the first embodiment, the third drain recovery space 43, the first drain recovery space 41, and the second drain recovery space 42 are aligned in the above order from the axial upstream side Dau toward the axial downstream side Dad. For this reason, the pressure of the steam flowing into the third drain recovery space 43 is higher than the pressure of the steam flowing into the first drain recovery space 41. Additionally, the pressure of the steam flowing into the first drain recovery space 41 is higher than the pressure of the steam flowing into the second drain recovery space 42.

In the present embodiment, as previously mentioned, the sealing performance between the final-stage upstream protrusion 33*ua* and the upstream vane ring protrusion 80*ua* is high. Therefore, even when there is a pressure difference between the first drain recovery space 41 and the third drain recovery space 43 located on the axial upstream side Dau of the first drain recovery space 41, this pressure difference can be maintained. For this reason, in the present embodiment, the pressure inside the third drain recovery space 43 can be maintained to be higher than the pressure inside the first drain recovery space 41.

Additionally, in the present embodiment, as previously mentioned, the sealing performance between the final-stage downstream protrusion 33*da* and the downstream vane ring protrusion 80*da* is high. Therefore, even when there is a pressure difference between the first drain recovery space 41 and the second drain recovery space 42 located on the axial downstream side Dad of the first drain recovery space 41, this pressure difference can be maintained. For this reason, in the present embodiment, the pressure inside the first drain recovery space 41 can be maintained to be higher than the pressure inside the second drain recovery space 42.

Thus, similarly to the first embodiment, also in the present embodiment, the recovery efficiency of the steam drain into the third drain recovery space 43, the first drain recovery space 41, and the second drain recovery space 42 can be improved.

First Modification Example of First Embodiment

Figure 4:
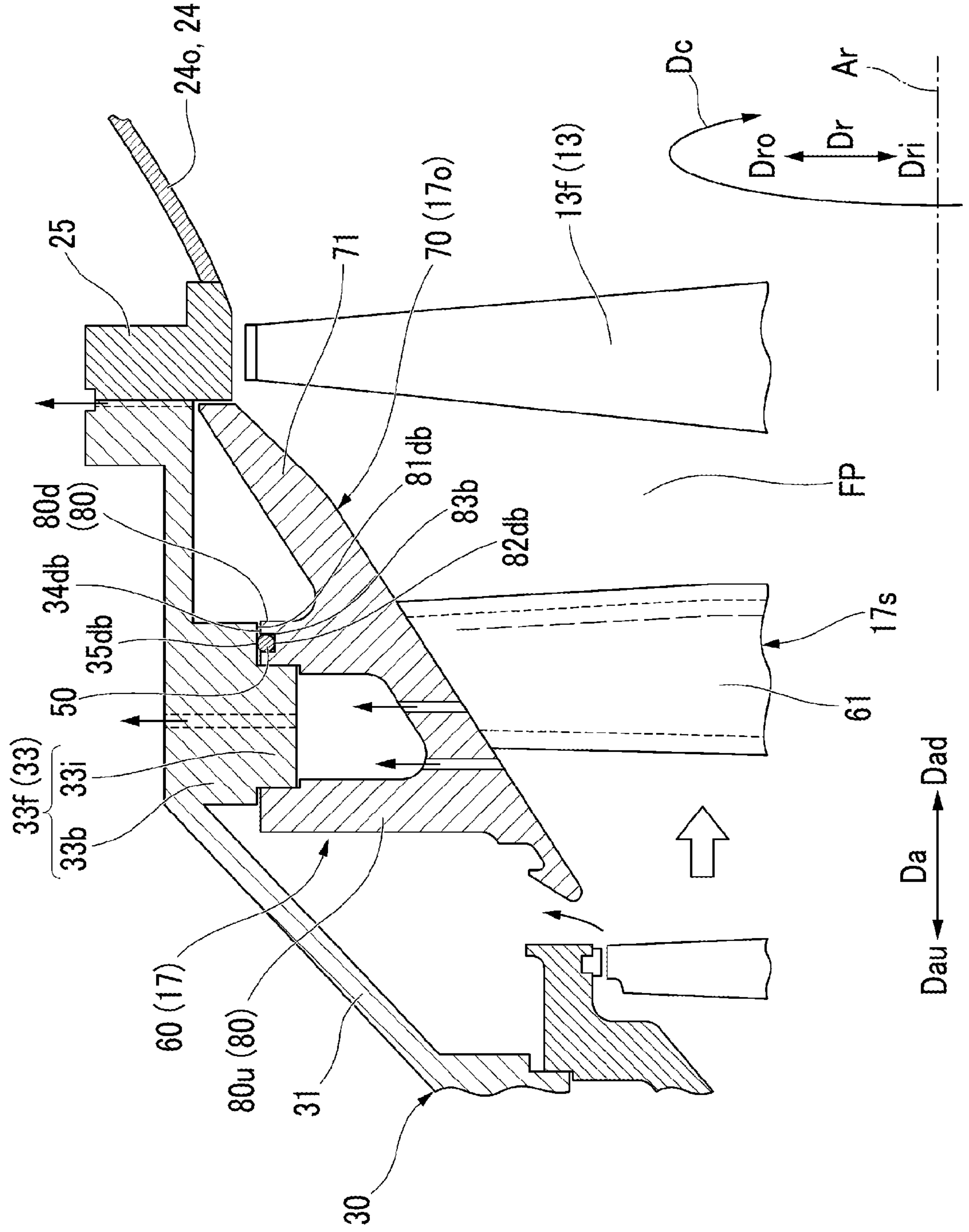
FIG. 4 is a cross-sectional view of a principal portion of an inner casing and a stator vane segment in a first modification example of the first embodiment according to the present disclosure.

In the first embodiment, the sealing member 50 is disposed in the seal groove 83 recessed from the vane ring downstream-side facing surface 81*d* facing the axial upstream side Dau to the axial downstream side Dad at the downstream vane ring protrusion 80*d*. However, as shown in FIG. 4, the sealing member 50 may be disposed in a seal groove 83*b* recessed from the vane ring downstream-side facing surface 81*db* facing the radial outer side Dro to the radial inner side Dri at the downstream vane ring protrusion 80*d*. In this case, a groove bottom surface of the seal groove 83*b* forms a vane ring downstream-side sealing surface 82*db* that extends in the circumferential direction Dc toward the radial outer side Dro. Additionally, a surface of the convex base portion 33*b* of the final-stage protrusion 33*f*, which faces the radial inner side Dri at a position on the axial downstream side Dad with respect to the entry portion 33*i*, forms a casing downstream-side facing surface 34*db*. Moreover, a portion of the casing downstream-side facing surface 34*db* that faces the vane ring downstream-side sealing surface 82*db* in the radial direction Dr forms a casing downstream-side sealing surface 35*db*.

As described above, the present modification example is a modification example of the first embodiment. However, the second embodiment may also be modified similarly to the present modification example. That is, in the second embodiment, the sealing member 50 may be disposed in a seal groove recessed from the vane ring upstream-side facing surface facing the radial outer side Dro to the radial inner side Dri at the upstream vane ring protrusion 80*u*. In this case, a groove bottom surface of the seal groove forms a vane ring upstream-side sealing surface that extends in the circumferential direction Dc toward the radial outer side Dro. Additionally, a surface of the final-stage upstream protrusion 33*ua* facing the radial inner side Dri forms a casing upstream-side facing surface. Moreover, a portion of the casing upstream-side facing surface that faces the vane ring upstream-side sealing surface in the radial direction Dr forms the casing upstream-side sealing surface.

Second Modification Example of First Embodiment

Figure 5:
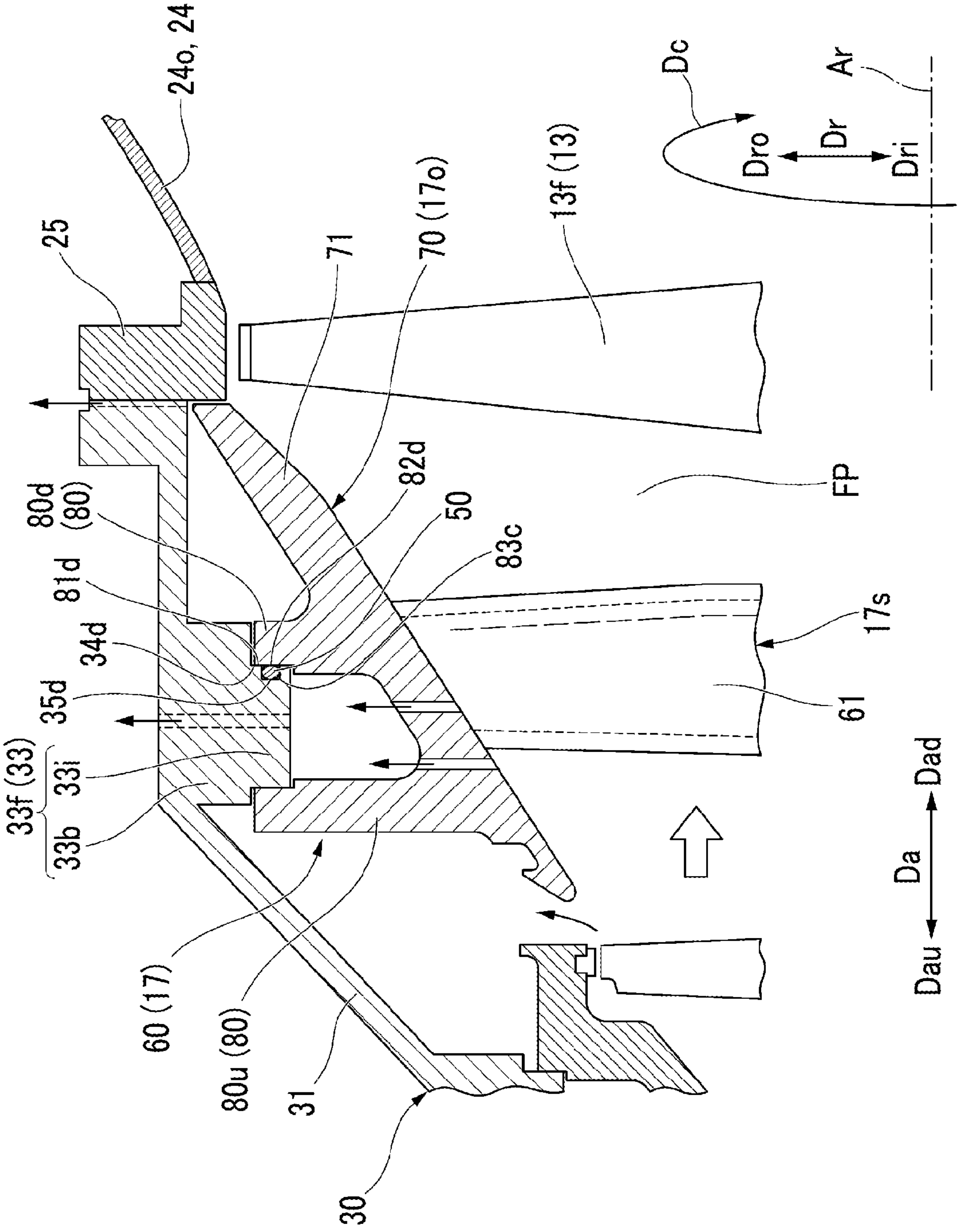
FIG. 5 is a cross-sectional view of a principal portion of an inner casing and a stator vane segment in a second modification example of the first embodiment according to the present disclosure.

In the first embodiment, the seal groove 83 is formed in the downstream vane ring protrusion 80*d*. However, as shown in FIG. 5, a seal groove 83*c* may be formed in the final-stage protrusion 33*f*. In this case, the seal groove 83*c* is recessed from the casing downstream-side facing surface 34*d* of the final-stage protrusion 33*f* toward the axial upstream side Dau. A groove bottom surface of the seal groove 83*c* forms the casing downstream-side sealing surface 35*d*. Additionally, a portion of the vane ring downstream-side facing surface 81*d* of the downstream vane ring protrusion 80*d* that faces the casing downstream-side sealing surface 35*d* forms the vane ring downstream-side sealing surface 82*d*.

As described above, the present second modification example is a modification example of the first embodiment. However, the first modification example of the second embodiment and of the first embodiment may also be modified similarly to the second modification example. That is, a seal groove may be formed in the final-stage protrusion.

Other Modification Examples

All of the steam turbines of the above-described embodiments and of the respective modification examples are dual flow exhaust type steam turbines. However, the steam turbines do not need to be the dual flow exhaust type and may be a single flow exhaust type.

ADDITIONAL NOTES

The stator vane segment 60 or 60*a* in each of the above embodiments is understood as follows, for example.

(1) The stator vane segment 60 or 60*a* in a first aspect includes an outer vane ring 70 or 70*a* that extends in a circumferential direction Dc with respect to an axis Ar, a plurality of stator vanes 61 that extend from the outer vane ring 70 or 70*a* to a radial inner side Dri with respect to the axis Ar and that are aligned in the circumferential direction Dc, and a sealing member 50 that is formed of a member different from the outer vane ring 70 or 70*a*.

Each of the plurality of stator vanes 61 has a cavity 62 formed inside the stator vane 61 and a vane surface drain passage 63 that allows a surface of the stator vane 61 and the cavity 62 to communicate with each other. The outer vane ring 70 or 70*a* has a vane ring body 71 and two vane ring protrusions 80 or 80*a*. The vane ring body 71 includes a gas path surface 72 that extends in the circumferential direction Dc and that faces the radial inner side Dri, a counter gas path surface 73 that extends in the circumferential direction Dc and that has a back-to-back relationship with the gas path surface 72, and a vane surface drain recovery passage 75. The two vane ring protrusions 80 or 80*a* protrude from the counter gas path surface 73 to the radial outer side Dro with respect to the axis Ar, extend in the circumferential direction Dc, face each other at an interval from each other in an axis direction Da where the axis Ar extends, and cooperate with a casing 30 or 30*a* present on an outer peripheral side of the vane ring body 71 to form a drain recovery space 41 between the two vane ring protrusions 80 or 80*a*. The vane surface drain recovery passage 75 extends from the cavity 62 toward the radial outer side Dro and is open at a position between the two vane ring protrusions 80 or 80*a* in the counter gas path surface 73. One vane ring protrusion 80 or 80*a* of the two vane ring protrusions 80 or 80*a* has a sealing surface 82*d*, 82*ua*, or 82*db*. The sealing member 50 is disposed between a part of the casing 30 and the sealing surface 82*d*, 82*ua*, or 82*db* of the one vane ring protrusion 80 or 80*a* and comes into contact with the sealing surface 82*d*, 82*ua*, or 82*db*.

In the present aspect, steam drain that has adhered to a stator surface of the stator vane 61 flows into the drain recovery space 41 through the vane surface drain passage 63 and the cavity 62. In the present aspect, since the sealing member 50 is disposed between a part of the casing 30 or 30*a* and the sealing surface 82*d*, 82*ua*, or 82*db* of the one vane ring protrusion 80 or 80*a*, the sealing performance between the casing 30 or 30*a* and the one vane ring protrusion 80 or 80*a* is improved. For this reason, even when there is a pressure difference between the drain recovery space 41 that is formed as the casing 30 or 30*a* and the outer vane ring 70 or 70*a* cooperate with each other and a space adjacent to the drain recovery space 41, the pressure difference can be maintained, and the outflow of steam from one of two adjacent spaces to the other can be suppressed. Therefore, in the present aspect, the steam drain can be guided to the drain recovery space 41 while suppressing the exhaust of the steam that has not been drained.

(2) The stator vane segment 60 or 60*a* in a second aspect is the stator vane segment 60 or 60*a* of the first aspect in which the vane ring body 71 has a gas path surface drain recovery passage 76 that extends from the gas path surface 72 toward the radial outer side Dro and that is open at a position of the counter gas path surface 73 between the two vane ring protrusions 80 or 80*a*.

In the present aspect, the steam drain that has adhered to the gas path surface 72 of the vane ring body 71 can be recovered.

(3) The stator vane segment 60 or 60*a* in a third aspect is the stator vane segment 60 or 60*a* of the first aspect or the second aspect in which the vane ring body 71 has a drain groove 77 that is recessed from the counter gas path surface 73 to the radial inner side Dri and that extends in the circumferential direction Dc, on an axial upstream side Dau with respect to an upstream vane ring protrusion 80*u* or 80*ua* located on the axial upstream side Dau which is one side of two sides in the axis direction Da, out of the two vane ring protrusions 80 or 80*a*.

In the present aspect, the steam drain from the axial upstream side Dau with respect to the stator vane segment 60 or 60*a* can be recovered in the drain groove 77.

(4) The steam turbine ST in a fourth aspect includes the stator vane segment 60 or 60*a* according to any one aspect of the first aspect to the third aspect, and the casing 30 or 30*a* that covers an outer peripheral side of the stator vane segment 60 or 60*a*.

The casing 30 or 30*a* has a casing body 31 that is separated from the stator vane segment 60 or 60*a* to the radial outer side Dro, extends in the circumferential direction DC, and covers the outer peripheral side of the stator vane segment 60 or 60*a*, at least one casing protrusion 33*f* or 33*fa*, and a drain discharge passage 45 or 45*a*. The drain discharge passage 45 or 45*a* extends from the drain recovery space 41 toward the radial outer side Dro and is open on an outer peripheral surface of the casing body 31. The at least one casing protrusion 33*f* or 33*fa* protrudes from the casing body 31 to the radial inner side Dri and extends in the circumferential direction Dc such that the casing protrusion 33*f* or 33*fa* cooperates with the outer vane ring 70 to form the drain recovery space 41 between the one casing protrusion 33*f* or 33*fa* and the two vane ring protrusions 80 or 80*a* on the radial outer side Dro with respect to the counter gas path surface 73. A part of the at least one casing protrusion 33*f* or 33*fa* overlaps, out of one vane ring protrusion 80 or 80*a* and the other vane ring protrusion 80 or 80*a* in the two vane ring protrusions 80 or 80*a*, the other vane ring protrusion 80 or 80*a* in terms of a position in the radial direction Dr with respect to the axis Ar, and is located, out of an axial upstream side Dau which is one side of two sides in the axis direction Da and an axial downstream side Dad which is the other side, on the axial downstream side Dad with respect to the other vane ring protrusion 80 or 80*a*. The part of the at least one casing protrusion 33*f* or 33*fa* has a casing other-side sealing surface 35*u* or 35*da* facing the axial upstream side Dau. The other vane ring protrusion 80 or 80*a* faces the axial downstream side Dad and has a vane ring other-side sealing surface 82*u* or 82*da* capable of coming into contact with the casing other-side sealing surface 35*u* or 35*da*. The other part of the at least one casing protrusion 33*f* or 33*fa* has a casing one-side sealing surface 35*d* or 35*ua* that comes into contact with the sealing member 50. The one vane ring protrusion 80 or 80*a* faces the casing one-side sealing surface 35*d* or 35*ua* at an interval therefrom, and has a vane ring one-side sealing surface 82*d*, 82*ua*, or 82*db* serving as the sealing surface 82*d*, 82*ua*, or 82*db*. The sealing member 50 is disposed between the casing one-side sealing surface 35*d* or 35*ua* and the vane ring one-side sealing surface 82*d*, 82*ua*, or 82*db*.

The stator vane segment 60 or 60*a* receives a force directed to the axial downstream side Dad from the steam flowing through the steam flow path FP during the driving of the steam turbine ST. For this reason, the stator vane segment 60 or 60*a* tends to move to the axial downstream side Dad relative to the casing 30 or 30*a*.

Thus, the vane ring other-side sealing surface 82*u* or 82*da* moves to the axial downstream side Dad with respect to the casing other-side sealing surface 35*u* or 35*da* and come into contact with the casing other-side sealing surface 35*u* or 35*da*. Therefore, in the present aspect, the sealing performance between a part of at least one casing protrusion 33*f* or 33*fa* and the other vane ring protrusion 80 or 80*a* during the driving of the steam turbine ST is high, and steam leakage from between a part of the at least one casing protrusion 33*f* or 33*fa* and the other vane ring protrusion 80 or 80*a* can be suppressed.

The sealing member 50 is disposed between the casing one-side sealing surfaces 35*d* or 35*ua* of the other part of the at least one casing protrusion 33*f* or 33*fa* and the vane ring one-side sealing surface 82*d*, 82*ua*, or 82*db* of the one vane ring protrusion 80 or 80*a*. For this reason, in the present aspect, even when the one vane ring protrusion 80 or 80*a* moves to the axial downstream side Dad with respect to the other part of the at least one casing protrusion 33*f* or 33*fa* by driving the steam turbine ST, the sealing performance between the other part of the at least one casing protrusion 33*f* or 33*fa* and the one vane ring protrusion 80 or 80*a* is high, and steam leakage from between the other part of the at least one casing protrusion 33*f* or 33*fa* and the vane ring protrusion 80 or 80*a* can be suppressed.

Thus, in the present aspect, even when there is a pressure difference between the drain recovery space 41 that is formed as the casing 30 or 30*a* and the outer vane ring 70 or 70*a* cooperate with each other and a space adjacent to the drain recovery space 41, the pressure difference can be maintained, and the outflow of steam from one of two adjacent spaces to the other can be suppressed.

(5) The steam turbine ST in a fifth aspect is the steam turbine ST of the fourth aspect in which an upstream vane ring protrusion 80*u* located on the axial upstream side Dau out of the two vane ring protrusions 80 forms the other vane ring protrusion 80.

The upstream vane ring protrusion 80*u* has a vane ring upstream-side sealing surface 82*u* serving as the vane ring other-side sealing surface 82*u*, which extends in the circumferential direction Dc toward the axial downstream side Dad. A downstream vane ring protrusion 80*d* located on the axial downstream side Dad with respect to the upstream vane ring protrusion 80*u* out of the two vane ring protrusions 80 forms the one vane ring protrusion 80. The downstream vane ring protrusion 80*d* has a vane ring downstream-side sealing surface 82*d* serving as the vane ring one-side sealing surface 82*d*, which extends in the circumferential direction Dc toward the axial upstream side Dau or extends in the circumferential direction Dc toward the radial outer side Dro. At least a part of the at least one casing protrusion 33*f* enters between the two vane ring protrusions 80. The at least one casing protrusion 33*f* includes an outer space defining surface 41*o*, a casing downstream-side sealing surface 35*d* serving as the casing one-side sealing surface 35*d*, and a casing upstream-side sealing surface 35*u* serving as the casing other-side sealing surface 35*u*. The outer space defining surface 41*o* faces an inner space defining surface 41*i*, which is a portion between the two vane ring protrusions 80 in the counter gas path surface 73, at an interval therefrom in the radial direction Dr with respect to the axis Ar. The casing upstream-side sealing surface 35*u* faces the vane ring upstream-side sealing surface 82*u* so as to be capable of coming into contact with the vane ring upstream-side sealing surface 82*u*. The casing downstream-side sealing surface 35*d* faces the vane ring downstream-side sealing surface 82*d* at an interval therefrom. The sealing member 50 is disposed between the casing downstream-side sealing surface 35*d* and the vane ring downstream-side sealing surface 82*d*.

In the present aspect, when the upstream vane ring protrusion 80*u* moves to the axial downstream side Dad with respect to the at least one casing protrusion 33*f* by driving the steam turbine ST, the vane ring upstream-side sealing surface 82*u* moves to the axial downstream side Dad with respect to the casing upstream-side sealing surface 35*u* and comes into contact with the casing upstream-side sealing surface 35*u*. Therefore, in the present aspect, the sealing performance between the at least one casing protrusion 33*f* and the upstream vane ring protrusion 80*u* during the driving of the steam turbine ST is high, and steam leakage from between the at least one casing protrusion 33*f* and the upstream vane ring protrusion 80*u* can be suppressed.

The sealing member 50 is disposed between the casing downstream-side sealing surface 35*d* of the at least one casing protrusion 33*f* and the vane ring downstream-side sealing surface 82*d* of the downstream vane ring protrusion 80*d*.

For this reason, in the present aspect, even when the downstream vane ring protrusion 80*d* moves to the axial downstream side Dad with respect to the at least one casing protrusion 33*f* by driving the steam turbine ST, the sealing performance between the at least one casing protrusion 33*f* and the downstream vane ring protrusion 80*d* is high, and steam leakage from between the at least one casing protrusion 33*f* and the downstream vane ring protrusion 80*d* can be suppressed.

(6) The steam turbine ST in a sixth aspect is the steam turbine ST of the fifth aspect in which the at least a part of the at least one casing protrusion 33*f* forms an entry portion 33*i* that enters between the two vane ring protrusions 80.

The entry portion 33*i* has a surface facing the radial inner side Dri, the casing upstream-side sealing surface 35*u* facing the axial upstream side Dau, and a casing downstream-side facing surface 34*d* facing the axial downstream side Dad. A surface of the entry portion 33*i* facing the radial inner side Dri forms the outer space defining surface 41*o*. The casing downstream-side facing surface 34*d* of the entry portion 33*i* faces a vane ring downstream-side facing surface 81*d*, which is a part of a surface of the downstream vane ring protrusion 80*d* facing the axial upstream side Dau, in the axis direction Da. A distance in the axis direction Da between the casing upstream-side sealing surface 35*u* and the vane ring upstream-side sealing surface 82*u* is smaller than a distance in the axis direction Da between the casing downstream-side facing surface 34*d* and the vane ring downstream-side facing surface 81*d* or is zero.

(7) The steam turbine ST in a seventh aspect is the steam turbine ST according to the sixth aspect in which the upstream vane ring protrusion 80*u* has an upstream space defining surface 41*u* that is located on the radial inner side Dri with respect to the vane ring upstream-side sealing surface 82*u* and that defines an edge of the drain recovery space 41 on the axial upstream side Dau toward the axial downstream side Dad.

The downstream vane ring protrusion 80*d* has a downstream space defining surface 41*d* that is located on the radial inner side Dri with respect to the vane ring downstream-side facing surface 81*d* and that defines an edge of the drain recovery space 41 on the axial downstream side Dad toward the axial upstream side Dau. The upstream space defining surface 41*u* is located on the axial downstream side Dad with respect to the vane ring upstream-side sealing surface 82*u*. The downstream space defining surface 41*d* is located on the axial upstream side Dau with respect to the vane ring downstream-side facing surface 81*d*.

In the present aspect, the vane ring upstream-side sealing surface 82*u* has a step in the axis direction Da with respect to the upstream space defining surface 41*u*, and a gap between the vane ring upstream-side sealing surface 82*u* and the casing upstream-side sealing surface 35*u* does not directly face the drain recovery space 41. For this reason, in the present aspect, the sealing performance between the at least one casing protrusion 33*f* and the upstream vane ring protrusion 80*u* can be improved. Additionally, in the present aspect, the vane ring downstream-side facing surface 81*d* has a step in the axis direction Da with respect to the downstream space defining surface 41*d*, and a gap between the vane ring downstream-side facing surface 81*d* and the casing downstream-side facing surface 34*d* does not directly face the drain recovery space 41. For this reason, in the present aspect, the sealing performance between the at least one casing protrusion 33*f* and the downstream vane ring protrusion 80*d* can be improved.

(8) The steam turbine ST in an eighth aspect is the steam turbine ST of the sixth aspect or the seventh aspect in which the downstream vane ring protrusion 80*d* has a seal groove 83 which is recessed from the vane ring downstream-side facing surface 81*d* to the axial downstream side Dad and extends in the circumferential direction Dc and into which the sealing member 50 enters.

A bottom surface of the seal groove 83 forms the vane ring downstream-side sealing surface 82*d* that extends in the circumferential direction DC toward the axial upstream side Dau.

(9) The steam turbine ST in a ninth aspect is the steam turbine ST of the fourth aspect in which an upstream vane ring protrusion 80*ua* located on the axial upstream side Dau out of the two vane ring protrusions 80*a* forms the one vane ring protrusion 80*a*.

The upstream vane ring protrusion 80*ua* has a vane ring upstream-side sealing surface 82*ua* serving as the vane ring one-side sealing surface 82*ua*, which extends in the circumferential direction Dc toward the radial outer side Dro or extends in the circumferential direction Dc toward the axial upstream side Dau. A downstream vane ring protrusion 80*da* located on the axial downstream side Dad out of the two vane ring protrusions 80*a* forms the other vane ring protrusion 80*a*. The downstream vane ring protrusion 80*da* has a vane ring downstream-side sealing surface 82*da* serving as the vane ring other-side sealing surface 82*da*, which extends in the circumferential direction Dc toward the axial downstream side Dad. The at least one casing protrusion 33*fa* has two casing protrusions 33*ua* and 33*da* facing each other at an interval in the axis direction Da. A portion between the two casing protrusions 33*ua* and 33*da* in a surface of the casing body 31 facing the radial inner side Dri forms an outer space defining surface 41*o* that faces an inner space defining surface 41*i*, which is a portion of the counter gas path surface 73 between the two vane ring protrusions 80*a*, at an interval therefrom in the radial direction Dr with respect to the axis Ar.

An upstream casing protrusion 33*ua* on the axial upstream side Dau out of the two casing protrusions 33*ua* and 33*da* has a casing upstream-side sealing surface 35*ua* serving as the casing one-side sealing surface 35*ua*, which faces the vane ring upstream-side sealing surface 82*ua* at an interval therefrom. A downstream casing protrusion 33*da* on the axial downstream side Dad out of the two casing protrusions 33*ua* and 33*da* has a casing downstream-side sealing surface 35*da* serving as the casing other-side sealing surface 35*da*, which faces the vane ring downstream-side sealing surface 82*da* capable of coming into contact with the vane ring downstream-side sealing surface 82*da* toward the axial upstream side Dau. The sealing member 50 is disposed between the casing upstream-side sealing surface 35*ua* and the vane ring upstream-side sealing surface 82*ua*.

The stator vane segment 60*a* receives a force directed to the axial downstream side Dad from the steam flowing through the steam flow path FP during the driving of the steam turbine ST. For this reason, the stator vane segment 60*a* tends to move to the axial downstream side Dad relative to the casing 30*a*. Thus, the vane ring downstream-side sealing surface 82*da* of the downstream vane ring protrusion 80*da* moves to the axial downstream side Dad with respect to the casing downstream-side sealing surface 35*da* of the downstream casing protrusion 33*da* and comes into contact with the casing downstream-side sealing surface 35*da*. Therefore, in the present aspect, the sealing performance between the downstream casing protrusion 33*da* and the downstream vane ring protrusion 80*da* during the driving of the steam turbine ST is high, and steam leakage from between the downstream casing protrusion 33*da* and the downstream vane ring protrusion 80*da* can be suppressed.

The sealing member 50 is disposed between the casing upstream-side sealing surface 35*ua* of the upstream casing protrusion 33*ua* and the vane ring upstream-side sealing surface 82*ua* of the upstream vane ring protrusion 80*ua*.

For this reason, in the present aspect, even when the upstream vane ring protrusion 80*ua* moves to the axial downstream side Dad with respect to the upstream casing protrusion 33*ua* by driving the steam turbine ST, the sealing performance between the upstream casing protrusion 33*ua* and the upstream vane ring protrusion 80*ua* is high, and steam leakage from between the upstream casing protrusion 33*ua* and the upstream vane ring protrusion 80*ua* can be suppressed.

(10) The steam turbine ST in a tenth aspect is the steam turbine ST of any one aspect of the fourth aspect to the ninth aspect in which the outer vane ring 70 or 70*a* and the casing 30 or 30*a* are configured to cooperate with each other to form, in addition to a first drain recovery space 41 which is the drain recovery space 41 between the two vane ring protrusion 80 or 80*a*, a second drain recovery space 42 adjacent to the axial downstream side Dad of the first drain recovery space 41 via a downstream vane ring protrusion 80*d* or 80*da* located on the axial downstream side Dad out of the two vane ring protrusions 80 or 80*a* between the casing body 31 and the counter gas path surface 73.

The casing body 31 has a second drain discharge passage 46 that extends from the second drain recovery space 42 toward the radial outer side Dro and that is open on an outer peripheral surface of the casing body 31.

In the present aspect, some of the steam drain that has adhered to the gas path surface 72 of the outer vane ring 70 flows into the second drain recovery space 42 from between the rear end surface 74 of the outer vane ring 70 or 70*a* and a member present on the axial downstream side Dad of the outer vane ring 70. In the present aspect, the sealing performance between the downstream vane ring protrusion 80*d* or 80*da* and the at least one casing protrusion 33*f* or 33*fa* is high. Therefore, even when there is a pressure difference between the first drain recovery space 41 and the second drain recovery space 42, this pressure difference can be maintained, and the outflow of steam from one of the two adjacent spaces 41 and 42 to the other can be suppressed. Therefore, in the present aspect, the steam drain can be guided to the first drain recovery space 41 and to the second drain recovery space 42 while suppressing the exhaust of the steam that has not been drained.

(11) The steam turbine ST in an eleventh aspect is the steam turbine ST of any one aspect from the fourth aspect to the tenth aspect in which the stator vane segment 60 or 60*a* is formed of a material having a higher steam corrosion resistance than that of the casing 30 or 30*a*.

In the present aspect, corrosion of the stator vane segment 60 or 60*a* caused by the steam can be suppressed.

INDUSTRIAL APPLICABILITY

In one aspect of the present disclosure, the recovery efficiency of the steam drain can be improved.

REFERENCE SIGNS LIST

10*a*: first steam turbine section
10*b*: second steam turbine section
11: rotor
12: rotor shaft
13: rotor blade row
13*f*: final-stage rotor blade row
17: stator vane segment
17*s*: stator vane row
17*i*: inner vane ring
17*o*: outer vane ring
18: bearing
19: steam inlet duct
20: casing
21: outer casing
213: casing inner space
22: drain discharge passage
23: exhaust casing
23*s*: exhaust space
24: diffuser
24*s*: diffuser space
24*o*: outer diffuser
24*i*: inner diffuser
25: connecting ring
26*d*: downstream end plate
26*u*: upstream end plate
27: side peripheral plate
28: exhaust port
30, 30*a*: inner casing (or simply casing)
31: casing body
32: casing rear end surface
33: casing protrusion
33*f*, 33*fa*: final-stage protrusion
33*b*: convex base portion
33*i*: entry portion
33*ua*: final-stage upstream protrusion (or upstream casing protrusion)
33*da*: final-stage downstream protrusion (or downstream casing protrusion)
34*ua*: casing upstream-side facing surface
34*d*, 34*db*: casing downstream-side facing surface
35*u*: casing upstream-side sealing surface (or casing other-side sealing surface)
35*ua*: casing upstream-side sealing surface (or casing one-side sealing surface)
35*d*: casing downstream-side sealing surface (or casing one-side sealing surface)
35*da*, 35*db*: casing downstream-side sealing surface (or casing other-side sealing surface)
41: first drain recovery space (or simply drain recovery space)
41*u*: upstream first space defining surface
41*d*: downstream first space defining surface

41*i*: inner first space defining surface
41*o*: outer first space defining surface
42: second drain recovery space
42*u*: upstream second space defining surface
42*i*: inner second space defining surface
42*o*: outer second space defining surface
43: third drain recovery space
45, 45*a*: first drain discharge passage (or drain discharge passage)
46: second drain discharge passage
47: third drain discharge passage
50: sealing member
60, 60*a*: final-stage stator vane segment
60*u*: upstream stator vane segment
61: stator vane
62: cavity
63: vane surface drain passage
70, 70*a*: outer vane ring
71: vane ring body
72: gas path surface
73: counter gas path surface
74: vane ring rear end surface
75: vane surface drain recovery passage
76: gas path surface drain recovery passage
77: drain groove
80, 80*a*: vane ring protrusion
80*u*: upstream vane ring protrusion (other vane ring protrusion)
80*ua*: upstream vane ring protrusion (one vane ring protrusion)
80*d*: downstream vane ring protrusion (one vane ring protrusion)
80*da*: downstream vane ring protrusion (other vane ring protrusion)
81*ua*: vane ring upstream-side facing surface
81*d*, 81*db*: vane ring downstream-side facing surface
82*u*: vane ring other-side sealing surface
82*ua*: vane ring upstream-side sealing surface (or simply sealing surface)
82*d*, 82*db*: vane ring downstream-side sealing surface (or simply sealing surface)
82*da*: vane ring downstream-side sealing surface
83, 83*a*, 83*b*, 83*c*: seal groove
Co: condenser
FP: steam flow path
ST: steam turbine
Ar: axis
Da: axis direction
Dau: axial upstream side
Dad: axial downstream side
Dc: circumferential direction
Dr: radial direction
Dri: radial inner side
Dro: radial outer side

The invention claimed is:

1. A stator vane segment comprising:
an outer vane ring that extends in a circumferential direction with respect to an axis;
a plurality of stator vanes that extend from the outer vane ring toward a radial inner side with respect to the axis and are aligned in the circumferential direction; and
a sealing member that is formed of a member different from the outer vane ring,
wherein each of the plurality of stator vanes has a cavity formed inside the stator vane and a vane surface drain passage that allows a surface of the stator vane and the cavity to communicate with each other,
the outer vane ring has a vane ring body and two vane ring protrusions,
the vane ring body includes a gas path surface that extends in the circumferential direction and that faces the radial inner side, a counter gas path surface that extends in the circumferential direction and that has a back-to-back relationship with the gas path surface, and a vane surface drain recovery passage,
the two vane ring protrusions protrude from the counter gas path surface to a radial outer side with respect to the axis, extend in the circumferential direction, face each other at an interval from each other in an axis direction where the axis extends, and cooperate with a casing present on an outer peripheral side of the vane ring body to form a drain recovery space between the two vane ring protrusions,
the vane surface drain recovery passage extends from the cavity toward the radial outer side and is open at a position of the counter gas path surface between the two vane ring protrusions,
one of the two vane ring protrusions has a sealing surface,
the sealing member is disposed between a part of the casing and the sealing surface of the one vane ring protrusion and comes into contact with the sealing surface, and
a part of only one casing protrusion, protruding from a casing body of the casing to the radial inner side and extending in the circumferential direction, enters between the two vane ring protrusions, so that the two vane ring protrusions cooperates with the casing to form the drain recovery space between the two vane ring protrusions.

2. The stator vane segment according to claim 1,
wherein the vane ring body has a gas path surface drain recovery passage that extends from the gas path surface toward the radial outer side and is open at a position of the counter gas path surface between the two vane ring protrusions.

3. The stator vane segment according to claim 1,
wherein the vane ring body has a drain groove that is recessed from the counter gas path surface to the radial inner side and extends in the circumferential direction, on an axial upstream side with respect to an upstream vane ring protrusion located on the axial upstream side which is one side of two sides in the axis direction, out of the two vane ring protrusions.

4. A steam turbine comprising:
the stator vane segment according to claim 1; and
the casing that covers an outer peripheral side of the stator vane segment,
wherein the casing has the casing body that is separated from the stator vane segment to the radial outer side, extends in the circumferential direction, and covers the outer peripheral side of the stator vane segment, the casing protrusion, and a drain discharge passage,
the drain discharge passage extends from the drain recovery space toward the radial outer side and is open on an outer peripheral surface of the casing body,
the casing protrusion protrudes from the casing body to the radial inner side and extends in the circumferential direction such that the casing protrusion cooperates with the outer vane ring to form the drain recovery space between the casing protrusion and the two vane ring protrusions on the radial outer side with respect to the counter gas path surface,
a part of the casing protrusion overlaps, out of the one vane ring protrusion and the other vane ring protrusion in the two vane ring protrusions, the other vane ring protrusion in terms of a position in the radial direction with respect to the axis, and is located, out of an axial upstream side which is one side of two sides in the axis direction and an axial downstream side which is the other side, on the axial downstream side with respect to the other vane ring protrusion, the part of the casing protrusion has a casing other-side sealing surface facing the axial upstream side, the other vane ring protrusion faces the axial downstream side and has a vane ring other-side sealing surface capable of coming into contact with the casing other-side sealing surface, the other part of the casing protrusion has a casing one-side sealing surface that comes into contact with the sealing member, the one vane ring protrusion faces the casing one-side sealing surface at an interval therefrom and has a vane ring one-side sealing surface serving as the sealing surface, and the sealing member is disposed between the casing one-side sealing surface and the vane ring one-side sealing surface.

5. The steam turbine according to claim 4, wherein an upstream vane ring protrusion located on the axial upstream side out of the two vane ring protrusions forms the other vane ring protrusion, the upstream vane ring protrusion has a vane ring upstream-side sealing surface serving as the vane ring other-side sealing surface, which extends in the circumferential direction toward the axial downstream side, a downstream vane ring protrusion located on the axial downstream side with respect to the upstream vane ring protrusion out of the two vane ring protrusions forms the one vane ring protrusion, the downstream vane ring protrusion has a vane ring downstream-side sealing surface serving as the vane ring one-side sealing surface, which extends in the circumferential direction toward the axial upstream side or extends in the circumferential direction toward the radial outer side, the part of the casing protrusion enters between the two vane ring protrusions, the casing protrusion includes an outer space defining surface, a casing downstream-side sealing surface serving as the casing one-side sealing surface, and a casing upstream-side sealing surface serving as the casing other-side sealing surface, the outer space defining surface faces an inner space defining surface, which is a portion of the counter gas path surface between the two vane ring protrusions, at an interval therefrom in the radial direction with respect to the axis, the casing upstream-side sealing surface faces the vane ring upstream-side sealing surface so as to be capable of coming into contact with the vane ring upstream-side sealing surface, the casing downstream-side sealing surface faces the vane ring downstream-side sealing surface at an interval therefrom, and the sealing member is disposed between the casing downstream-side sealing surface and the vane ring downstream-side sealing surface.

6. The steam turbine according to claim 5, wherein the part of the casing protrusion forms an entry portion that enters between the two vane ring protrusions, the entry portion has a surface facing the radial inner side, the casing upstream-side sealing surface facing the axial upstream side, and a casing downstream-side facing surface facing the axial downstream side, a surface of the entry portion facing the radial inner side forms the outer space defining surface, the casing downstream-side facing surface of the entry portion faces a vane ring downstream-side facing surface, which is a part of a surface of the downstream vane ring protrusion facing the axial upstream side, in the axis direction, and a distance in the axis direction between the casing upstream-side sealing surface and the vane ring upstream-side sealing surface is smaller than a distance in the axis direction between the casing downstream-side facing surface and the vane ring downstream-side facing surface or is zero.

7. The steam turbine according to claim 6, wherein the upstream vane ring protrusion has an upstream space defining surface that is located on the radial inner side with respect to the vane ring upstream-side sealing surface and that defines an edge of the drain recovery space on the axial upstream side toward the axial downstream side, the downstream vane ring protrusion has a downstream space defining surface that is located on the radial inner side with respect to the vane ring downstream-side facing surface and that defines an edge of the drain recovery space on the axial downstream side toward the axial upstream side, the upstream space defining surface is located on the axial downstream side with respect to the vane ring upstream-side sealing surface, and the downstream space defining surface is located on the axial upstream side with respect to the vane ring downstream-side facing surface.

8. The steam turbine according to claim 6, wherein the downstream vane ring protrusion has a seal groove which is recessed from the vane ring downstream-side facing surface to the axial downstream side and extends in the circumferential direction and into which the sealing member enters, and a bottom surface of the seal groove forms the vane ring downstream-side sealing surface that extends in the circumferential direction toward the axial upstream side.

9. The steam turbine according to claim 4, wherein the outer vane ring and the casing are configured to cooperate with each other to form, in addition to a first drain recovery space at which is the drain recovery space between the two vane ring protrusions, a second drain recovery space adjacent to the axial downstream side of the first drain recovery space via the downstream vane ring protrusion located on the axial downstream side out of the two vane ring protrusions between the casing body and the counter gas path surface, and the casing body has a second drain discharge passage that extends from the second drain recovery space toward the radial outer side and that is open on the outer peripheral surface of the casing body.

10. The steam turbine according to claim 4, wherein the stator vane segment is formed of a material having a higher steam corrosion resistance than that of the casing.

* * * * *